US010574450B2

(12) United States Patent
Lucamarini et al.

(10) Patent No.: US 10,574,450 B2
(45) Date of Patent: Feb. 25, 2020

(54) OPTICAL QUANTUM COMMUNICATION SYSTEM

(71) Applicant: Kabushiki Kaisha Toshiba, Minato-ku (JP)

(72) Inventors: Marco Lucamarini, Cambridge (GB); Zhiliang Yuan, Cambridge (GB); Andrew James Shields, Cambridge (GB); James Dynes, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 217 days.

(21) Appl. No.: 15/894,356

(22) Filed: Feb. 12, 2018

(65) Prior Publication Data

US 2018/0241553 A1 Aug. 23, 2018

(30) Foreign Application Priority Data

Feb. 20, 2017 (GB) .................................. 1702741.8

(51) Int. Cl.
*H04L 29/00* (2006.01)
*H04L 9/08* (2006.01)
(Continued)

(52) U.S. Cl.
CPC ........... *H04L 9/0858* (2013.01); *H04B 10/54* (2013.01); *H04B 10/70* (2013.01); *H04B 10/85* (2013.01); *G06N 10/00* (2019.01)

(58) Field of Classification Search
CPC ....... H04L 9/0858; H04B 10/70; H04B 10/85; H04B 10/5561; H04B 10/54; G06N 10/00
(Continued)

(56) References Cited

U.S. PATENT DOCUMENTS 2,994,827 A * 8/1961 MacMillan ............ H03H 11/20
  327/252
7,266,304 B2 * 9/2007 Duraffourg ........... H04L 9/0852
  380/256
(Continued)

FOREIGN PATENT DOCUMENTS

WO WO 2009/011255 A1 1/2009

OTHER PUBLICATIONS

Takesue, H., et al. "Differential phase shift quantum key distribution experiment over 105 km fibre." New Journal of Physics 7.1 (2005): 232. (Year: 2005).*

(Continued)

*Primary Examiner* — Syed A Zaidi
(74) *Attorney, Agent, or Firm* — Oblon, McClelland, Maier & Neustadt, L.L.P.

(57) ABSTRACT

A quantum communication system for distributing a key between first and second units, the system being configured to implement phase-based measurement device independent quantum cryptography, the system comprising first and second units adapted to apply phase shifts to light pulses and a detection unit adapted to cause interference between light pulses received from the first and second units and measure said interference, wherein the first and second units each comprise at least one phase modulator adapted to apply a phase shift, said phase shift comprising a global phase component and a relative phase component, wherein said global phase component represents a phase shift selected randomly in the range from 0° to 360° from a fixed phase reference and said relative phase component is a phase shift selected randomly from 0°, 90°, 180° and 270° from the phase shift introduced by the global phase component.

20 Claims, 25 Drawing Sheets

(51) Int. Cl.
  *H04B 10/54* (2013.01)
  *H04B 10/70* (2013.01)
  *H04B 10/85* (2013.01)
  *G06N 10/00* (2019.01)

(58) Field of Classification Search
  USPC .......................................................... 380/256
  See application file for complete search history.

(56) References Cited

U.S. PATENT DOCUMENTS

| | | | | |
|---|---|---|---|---|
| 7,400,724 | B2* | 7/2008 | Weinfurther | H04L 9/0852 380/256 |
| 7,457,416 | B1* | 11/2008 | Elliott | H04L 9/0852 380/256 |
| 7,515,716 | B1* | 4/2009 | Elliott | H04L 9/0858 380/256 |
| 7,580,524 | B2* | 8/2009 | Gisin | H04L 9/0852 380/256 |
| 2004/0151321 | A1* | 8/2004 | Lutkenhaus | H04L 9/0858 380/278 |
| 2007/0223698 | A1* | 9/2007 | Tsurumaru | H04B 10/70 380/256 |
| 2009/0010435 | A1* | 1/2009 | Zbinden | H04B 10/70 380/256 |
| 2010/0002881 | A1* | 1/2010 | Youn | H04B 10/70 380/256 |
| 2010/0027794 | A1* | 2/2010 | Yuan | H04B 10/70 380/255 |
| 2010/0098252 | A1* | 4/2010 | Kanter | H04L 9/0852 380/256 |
| 2010/0195831 | A1* | 8/2010 | Tanaka | H04B 10/548 380/256 |
| 2015/0365230 | A1 | 12/2015 | Bovino | |

OTHER PUBLICATIONS

Ekert, Artur K., et al. "Practical quantum cryptography based on two-photon interferometry." Physical Review Letters 69.9 (1992): 1293. (Year: 1992).*
Office Action dated Jan. 29, 2019 in corresponding Japanese Patent Application No. 2018-022115 (with English Translation), 11 pages.
Toyohiro Tsurumaru et al., "An Attempt to Improve the Security of the Implementation of Quantum Cryptography—Fill the Gap Between Theory and Equipment-", Information Processing Society of Japan, vol. 55, No. 12, 597th vol. of set, 2014, pp. 1390-1396 (with cover pages and English translation).
Intellectual Property Office, Combined Search and Examination Report dated Aug. 9, 2017 in GB1702741.8 filed on Feb. 20, 2017.
Hoi-Kwong Lo et al., "Measurement-device-independent quantum key distribution", Phys. Rev. Lett. 108, 130503, Mar. 30, 2012, pp. 5.
Kiyoshi Tamaki et al., "Phase encoding schemes for measurement-device independent quantum key distribution with basis-dependent flaw", Phys. Rev. A 85, 042307, 2012, pp. 14.
Daniel Gottesman et al, "Security of Quantum Key Distribution with Imperfect Devices," Quantum Information and Computation, vol. 4, No. 5, 2004, pp. 36.
Hoi-Kwong Lo et al., "Decoy State Quantum Key Distribution," Physical Review Letters, 94, 230504, 2005, pp. 4.
Xiongfeng Ma et al., "Alternative schemes for measurement-device-independent quantum key distribution," arXiv:1204.4856v2, https://arxiv.orq/abs/1204.4856, Dec. 24, 2012, pp. 30.

* cited by examiner

| Charlie reveals detector | Alice & Bob reveal phases $(\rho_A, \rho_B)$ | Alice & Bob reveal bases $(\alpha_A, \alpha_B)$ | Alice calculates key bit $(b_A)$ | | Bob calculates key bit $(b_B)$ | |
|---|---|---|---|---|---|---|
| D0 | $\rho_A \neq \rho_B \bmod \pi$ | - | - | | - | |
| | $\rho_A = \rho_B$ | $\alpha_A \neq \alpha_B$ | - | | - | |
| | | $\alpha_A = \alpha_B$ | $\beta_A = 0$ | $b_A = 0$ | $\beta_B = 0$ | $b_B = 0$ |
| | | | $\beta_A = \pi$ | $b_A = 1$ | $\beta_B = \pi$ | $b_B = 1$ |
| | $\rho_A = \rho_B + \pi$ | $\alpha_A \neq \alpha_B$ | - | | - | |
| | | $\alpha_A = \alpha_B$ | $\beta_A = 0$ | $b_A = 0$ | $\beta_B = \pi$ | $b_B = 0$ |
| | | | $\beta_A = \pi$ | $b_A = 1$ | $\beta_B = 0$ | $b_B = 1$ |
| D1 | $\rho_A \neq \rho_B \bmod \pi$ | - | - | | - | |
| | $\rho_A = \rho_B$ | $\alpha_A \neq \alpha_B$ | - | | - | |
| | | $\alpha_A = \alpha_B$ | $\beta_A = 0$ | $b_A = 0$ | $\beta_B = \pi$ | $b_B = 0$ |
| | | | $\beta_A = \pi$ | $b_A = 1$ | $\beta_B = 0$ | $b_B = 1$ |
| | $\rho_A = \rho_B + \pi$ | $\alpha_A \neq \alpha_B$ | - | | - | |
| | | $\alpha_A = \alpha_B$ | $\beta_A = 0$ | $b_A = 0$ | $\beta_B = 0$ | $b_B = 0$ |
| | | | $\beta_A = \pi$ | $b_A = 1$ | $\beta_B = \pi$ | $b_B = 1$ |

Time →

Figure 6

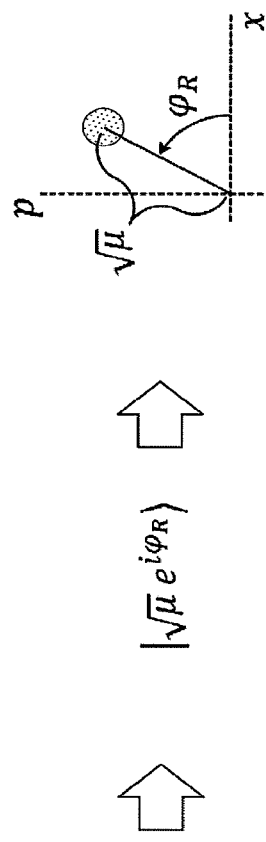
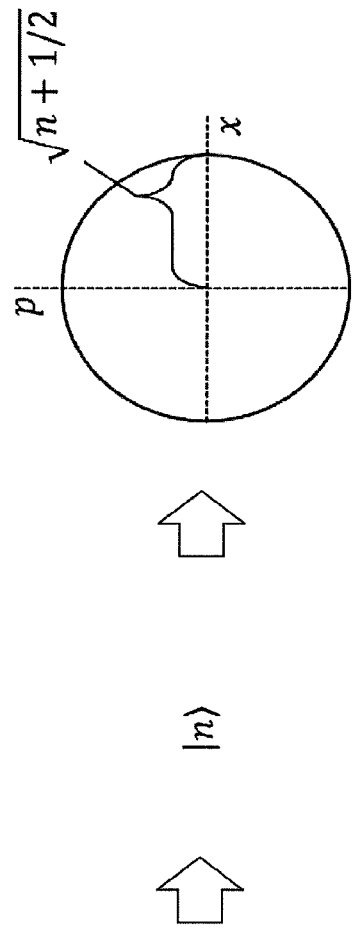

| Charlie reveals detector | Alice & Bob reveal phases $(\rho_A, \rho_B)$ | Alice & Bob reveal bases $(\alpha_A, \alpha_B)$ | Alice calculates key bit $(b_A)$ | | Bob calculates key bit $(b_B)$ | |
|---|---|---|---|---|---|---|
| D0 | $\rho_A \neq \rho_B + \Delta\varphi_{AB}^{(C)} \mod \pi$ | - | - | - | - | - |
| D0 | $\rho_A = \rho_B + \Delta\varphi_{AB}^{(C)}$ | $\alpha_A \neq \alpha_B$ | - | - | - | - |
| D0 | | $\alpha_A = \alpha_B$ | $\beta_A = 0$ | $b_A = 0$ | $\beta_B = 0$ | $b_B = 0$ |
| D0 | | | $\beta_A = \pi$ | $b_A = 1$ | $\beta_B = \pi$ | $b_B = 1$ |
| D0 | $\rho_A = \rho_B + \Delta\varphi_{AB}^{(C)} + \pi$ | $\alpha_A \neq \alpha_B$ | - | - | - | - |
| D0 | | $\alpha_A = \alpha_B$ | $\beta_A = 0$ | $b_A = 0$ | $\beta_B = \pi$ | $b_B = 0$ |
| D0 | | | $\beta_A = \pi$ | $b_A = 1$ | $\beta_B = 0$ | $b_B = 1$ |
| D1 | $\rho_A \neq \rho_B + \Delta\varphi_{AB}^{(C)} \mod \pi$ | - | - | - | - | - |
| D1 | $\rho_A = \rho_B + \Delta\varphi_{AB}^{(C)}$ | $\alpha_A \neq \alpha_B$ | - | - | - | - |
| D1 | | $\alpha_A = \alpha_B$ | $\beta_A = 0$ | $b_A = 0$ | $\beta_B = \pi$ | $b_B = 0$ |
| D1 | | | $\beta_A = \pi$ | $b_A = 1$ | $\beta_B = 0$ | $b_B = 1$ |
| D1 | $\rho_A = \rho_B + \Delta\varphi_{AB}^{(C)} + \pi$ | $\alpha_A \neq \alpha_B$ | - | - | - | - |
| D1 | | $\alpha_A = \alpha_B$ | $\beta_A = 0$ | $b_A = 0$ | $\beta_B = 0$ | $b_B = 0$ |
| D1 | | | $\beta_A = \pi$ | $b_A = 1$ | $\beta_B = \pi$ | $b_B = 1$ |

From the classical modality, A&B reconstruct the phase difference $\Delta\varphi_{AB}^{(C)}$ for all the events announced by Charlie.

OPTICAL QUANTUM COMMUNICATION SYSTEM

FIELD

Embodiments relate generally to the field of quantum communication systems.

BACKGROUND

In a quantum communication system, information is sent between a transmitter and a receiver by encoded single quanta, such as single photons. Each photon carries one bit of information encoded upon a property of the photon, such as its polarization, phase, time or energy. The photon may even carry more than one bit of information, for example, by using properties such as angular momentum.

Quantum key distribution (QKD) is a technique that results in the sharing of cryptographic keys between two parties: a transmitter often referred to as "Alice"; and a receiver often referred to as "Bob". The attraction of this technique is that it allows to quantify the maximum information potentially known to an unauthorised eavesdropper, often referred to as "Eve". In many forms of QKD, Alice and Bob use two or more non-orthogonal bases in which to encode the bit values. These bases are kept secret during the quantum communication and are disclosed in a public discussion only after all the measurements have been completed by Bob. The laws of quantum mechanics dictate that measurement of the photons by Eve without prior knowledge of the encoding basis causes an unavoidable change to the quantum state of some of the photons. This will cause errors in the bit values sent between Alice and Bob. By comparing a part of their common bit string, Alice and Bob can thus determine the potential information gained by Eve. This is done in the post-processing stage, along with other classical procedures like error correction, privacy amplification and message authentication. These post-processing procedures are well-known in the prior art and will be therefore omitted in the following description. However they still represent an essential part of all the schemes we will present.

Measurement-device-independent (MDI) QKD has been developed for the situation where the security of the measurement devices owned by Bob might be in doubt. In MDI-QKD, the user Bob is no more configured as an optical receiver, as in QKD, but rather as an optical transmitter, similarly to the other user Alice (FIG. 2(b)). The two optical transmitters Alice and Bob send light pulses to a relay station, usually called "Charlie", which optically couples and measure them. Alice and Bob can distil a secret key from the publicly announced results of Charlie's counts. Because in MDI QKD the users Alice and Bob are both configured as optical transmitters, the security is not threatened by the vulnerabilities of the optical receiver. Protecting optical transmitters is far easier than protecting optical receivers. In the former case, the optical pulses are prepared locally by a trusted user, whereas in the latter they are received from the outside, prepared by someone who is untrusted and possibly interested in breaking the security of the system. It is worth noticing that if Charlie is evil and does not comply with the correct execution of the MDI QKD protocol, the two honest users Alice and Bob can always detect his attempt at cheating with very high probability by the laws of quantum mechanics.

BRIEF DESCRIPTION OF THE FIGURES

Non-limiting embodiments, will now be described with reference to the following figures in which:

FIG. 6 is a table demonstrating examples of how Alice, Bob and Charlie release their results in a protocol performed using the apparatus of FIG. 1;

FIGS. 10(a) and 10(b) are schematics showing the effect of the phase randomiser;

FIG. 18 is a table showing how the key may be derived in presence of noisy channels;

Figure 1:
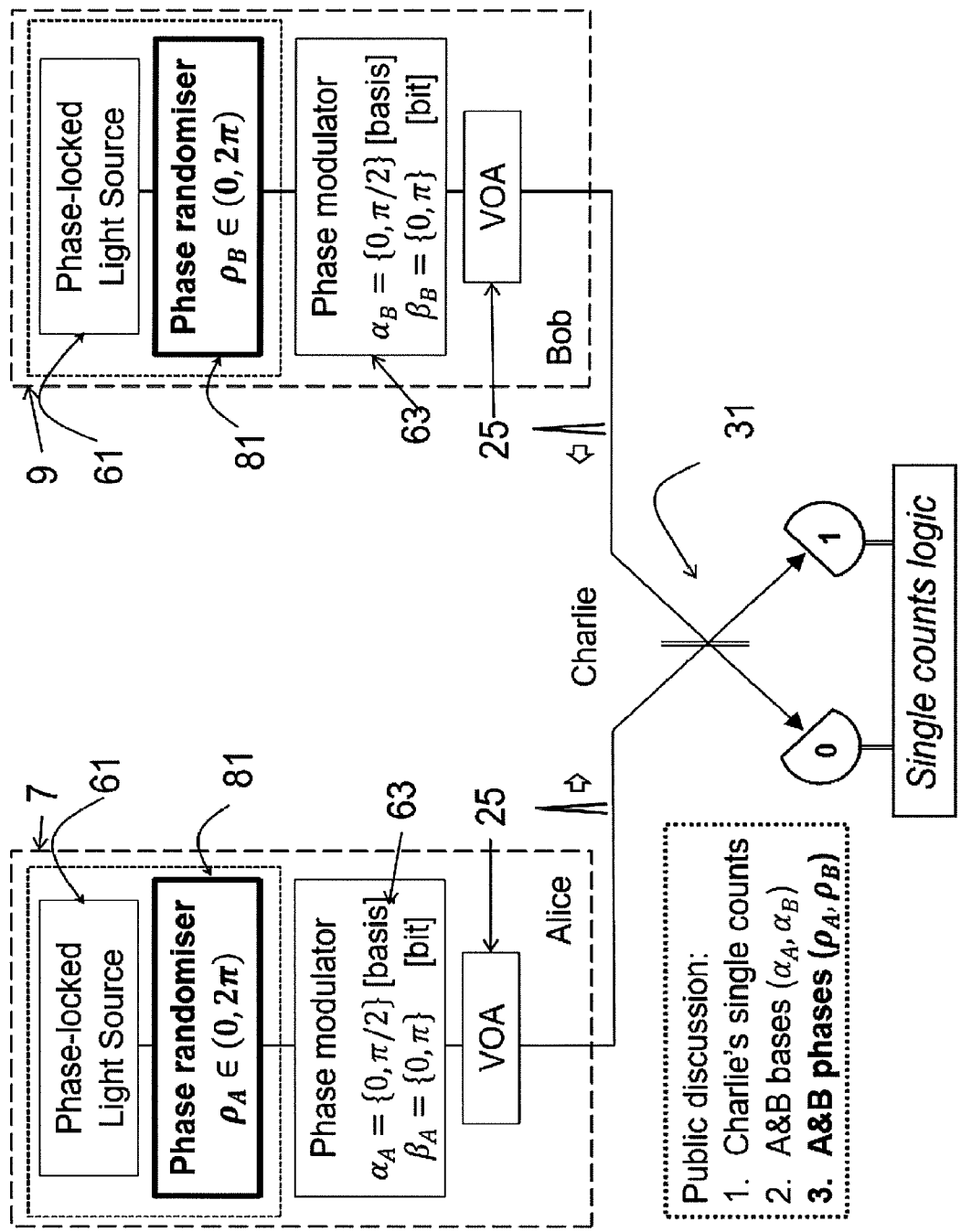
FIG. 1 is a schematic of a quantum communication system in accordance with an embodiment.

In a first embodiment, a quantum communication system for distributing a key between first and second units is provided, the system being configured to implement phase-based measurement device independent quantum cryptography, the system comprising first and second units adapted to apply phase shifts to light pulses and a detection unit adapted to cause interference between light pulses received from the first and second units and measure said interference, wherein the first and second units each comprise at least one phase modulator adapted to apply a phase shift, said phase shift comprising a global phase component and a relative phase component, wherein said global phase component represents a phase shift selected in the range from 0° to 360° from a fixed phase reference and said relative phase component is a phase shift selected from 0°, 90°, 180° and 270° from the phase shift introduced by the global phase component.

In an embodiment, the detection unit is adapted to cause and measure first order interference between the pulses from the first and second units.

The system may comprise a random phase unit adapted to randomly select the global phase over the range from 0° to 360°. This unit may be configured to divide the range from 0° to 360° into L segments, where L is an integer of at least 3, and said random phase unit is adapted to randomly select a segment to apply the global phase. The random phase unit may be active or passive. In some embodiments, L may be an integer of at least 6, in others at least 12.

The first and second units may comprise their own light sources, in a further embodiment, the system may be a so-called closed loop system where the detection unit comprises a light source, the system further comprising a first pathway adapted to direct light in a loop from the detection unit, though the first unit, through the second unit and then back to the detection unit, and a second pathway adapted to direct light in a loop from the detection unit, though the second unit, through the first unit and then back to the detection unit, the first and second units modulating the phase of the light pulses emitted from the detection unit.

The system may be adapted to perform so-called decoy state protocol and comprise an intensity modulator adapted to vary the intensity of pulses leaving the first and second units on a pulse-by-pulse basis.

Various methods may be employed to balance the system for noise, for example the detection unit may comprise a phase modulator which can be used to measure the drift in the system. In further embodiments, a phase locked loop may be employed to lock the phase of the light outputted from the detection unit with that of the two light sources in the first and second units.

In further embodiments, the first and second units may comprise a memory, said memory being adapted to store the global phase and the relative phase for each light pulse. Further, a communication channel may be provided between said first and second units, said first and second unit being provided with a processor, the processor in one unit being able to communicate with the processor in the other unit over the said communication channel, the processors in the first and second units being adapted to ignore measurement results where the global phase did not match.

In a further embodiment, a method of communicating a key between first and second units in a quantum communication system is provided, the method comprising:
  applying phase shifts to light pulses that pass through a phase modulator in the first unit and applying phase shifts to light pulses that pass through a phase modulator in the second unit, said phase shifts comprising a global phase component and a relative phase component, wherein said global phase component represents a phase shift selected in the range from 0° to 360° from a fixed phase reference and said relative phase component is a phase shift selected from 0°, 90°, 180° and 270° from the phase shift introduced by the global phase component, the relative phase shifts 0° and 180° forming a first measurement basis and the relative phase shifts 90° and 270° forming a second measurement basis; and
  interfering light pulses received from the first and second units at a measuring unit, wherein the method further comprises:
  announcing by the measuring unit the results of the interference measurements;
  announcing by the first and second units the global phase applied to each measurement;
  announcing by the first and second measure the basis used in the relative phase shift; and
  deriving the key from the measurements where the global phase applied by the first and second units match and the basis used in the relative phase shift match, the first and the second unit both being able to derive the key from the knowledge of the relative phase shift applied and the result of the interference measurement.

In an embodiment, the global phase is deemed to match if the global phase applied by the first and second units is within a misalignment angle. For example, the key may be distilled even when the two global phases do not exactly match:
  Alice phase=30 deg
  Bob phase=45 deg
  Channel noise misalignment angle=15 deg
The users can distil a key bit in this case even if their phases are different. If the noise misalignment angle is subtracted from the phase values, perfectly matching phases (45−15=30 deg) are obtained.

As explained above, the global phase is randomly selected this means that the state seen by the other parties (who do not know the global phase for that pulse nor will be given information later to derive the global phase) will be given by the following incoherent superposition of n states |n⟩ that is described by:

$$\sum_{n=0}^{\infty} e^{-\mu} \frac{\mu}{n!} |n\rangle\langle n|,$$

where μ is the mean photon number, or intensity, of the emitted pulses.

As noted above, in an embodiment, the range from 0° to 360° is divided into L segments, where L is an integer of at least 3, and said random phase unit is adapted to randomly select a segment to apply the global phase.

In a further embodiment, privacy amplification is performed to derive said key. By using the above method, less privacy amplification is required to derive a secure key.

In a further embodiment, the above method is adapted to include the so-called decoy state protocol where the method further comprises:
  applying intensity modulation to the pulses in the first and second units such that the intensity of the pulses leaving the first and second units varies between two of more fixed levels from pulse to pulse,
  announcing the intensity applied to the pulses to allow the first and second units to perform statistics concerning the error rate in the pulses.

Figure 2A:
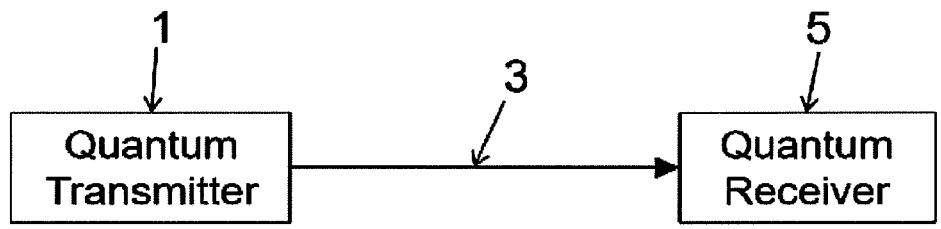
FIG. 2(a) is a schematic of a basic QKD system and FIG. 2(b) is a schematic of a measurement device independent (MDI) QKD system.

FIG. 1 shows a quantum communication system which uses a phase-randomised phase-based MDI-QKD arrangement (PMDI). The differences between MDI-QKD and QKD are shown in FIG. 2. In standard QKD is shown in FIG. 2(a), a quantum transmitter (which will be called Alice) 1 transmits over a secure channel 3 to a quantum receiver 5 (which will be called Bob).

Alice and Bob use two non-orthogonal bases in which to encode the bit values. For example, if the encryption is to use polarisation of the photons, Alice and Bob can agree to send photons in a first basis that comprises horizontal and vertical polarisations or a second basis which comprises diagonal and anti-diagonal polarisations. Alice 1 randomly changes the basis as she sends weak light pulses to Bob 5. The bases used by Alice 1 are kept secret during the quantum communication and are disclosed in a public discussion only after all the measurements have been completed by Bob 5. The laws of quantum mechanics dictate that measurement of the photons by an eavesdropper intercepting the communication (who will be referred to as Eve) without prior knowledge of the encoding basis causes an unavoidable change to the quantum state of some of the photons. This will cause errors in the bit values sent between Alice 1 and Bob 5.

By comparing a part of their common bit string, Alice 1 and Bob 5 can thus determine the potential information gained by Eve. This is done in the post-processing stage, along with other classical procedures like error correction, privacy amplification and message authentication.

Figure 2B:
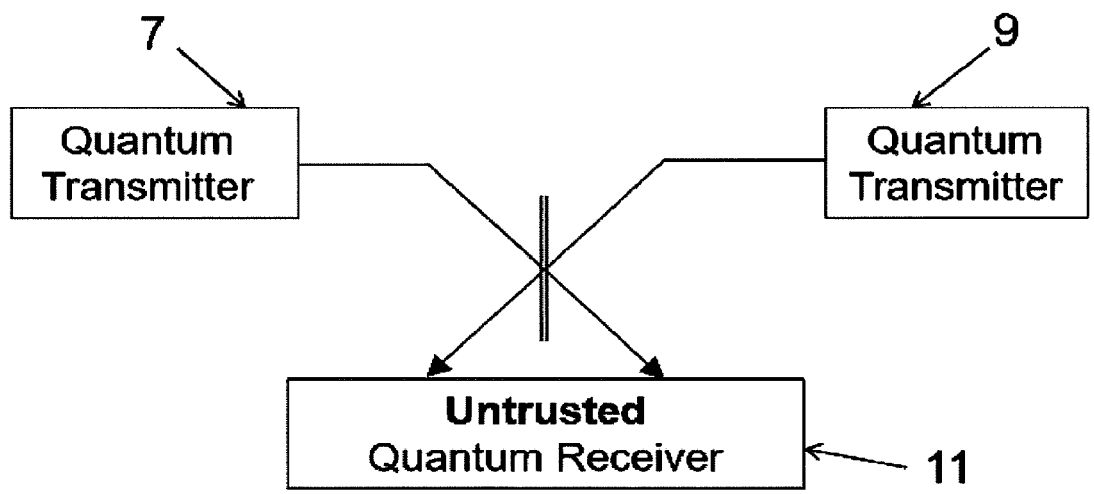

Measurement device independent (MDI) QKD is shown schematically in FIG. 2(b). Here, a key is again shared between Alice and Bob. However, here, Alice 7 and Bob 9 transmit to trusted quantum receiver 11 (which will be called Charlie). Measurement-device-independent (MDI) QKD has been developed for the situation where the security of the measurement devices owned by Bob might be in doubt. In MDI-QKD, the user Bob 9 is no more configured as an optical receiver, as in QKD, but rather as an optical transmitter, similarly to the other user Alice 7.

The two optical transmitters Alice 7 and Bob 9 send light pulses to a relay station, usually called "Charlie", which optically couples and measure them. Alice and Bob can distil a secret key from the publicly announced results of Charlie's counts. In MDI QKD the users Alice and Bob are both configured as optical transmitters, therefore the security is not threatened by the vulnerabilities of the optical receiver. Protecting optical transmitters is far easier than protecting optical receivers. In the former case, the optical pulses are prepared locally by a trusted user, whereas in the latter they are received from the outside, prepared by someone who is untrusted and possibly interested in breaking the security of the system. It is worth noticing that if Charlie is evil and does not comply with the correct execution of the MDI QKD protocol, the two honest users Alice and Bob can always detect his attempt at cheating with very high probability by the laws of quantum mechanics.

Figure 3:
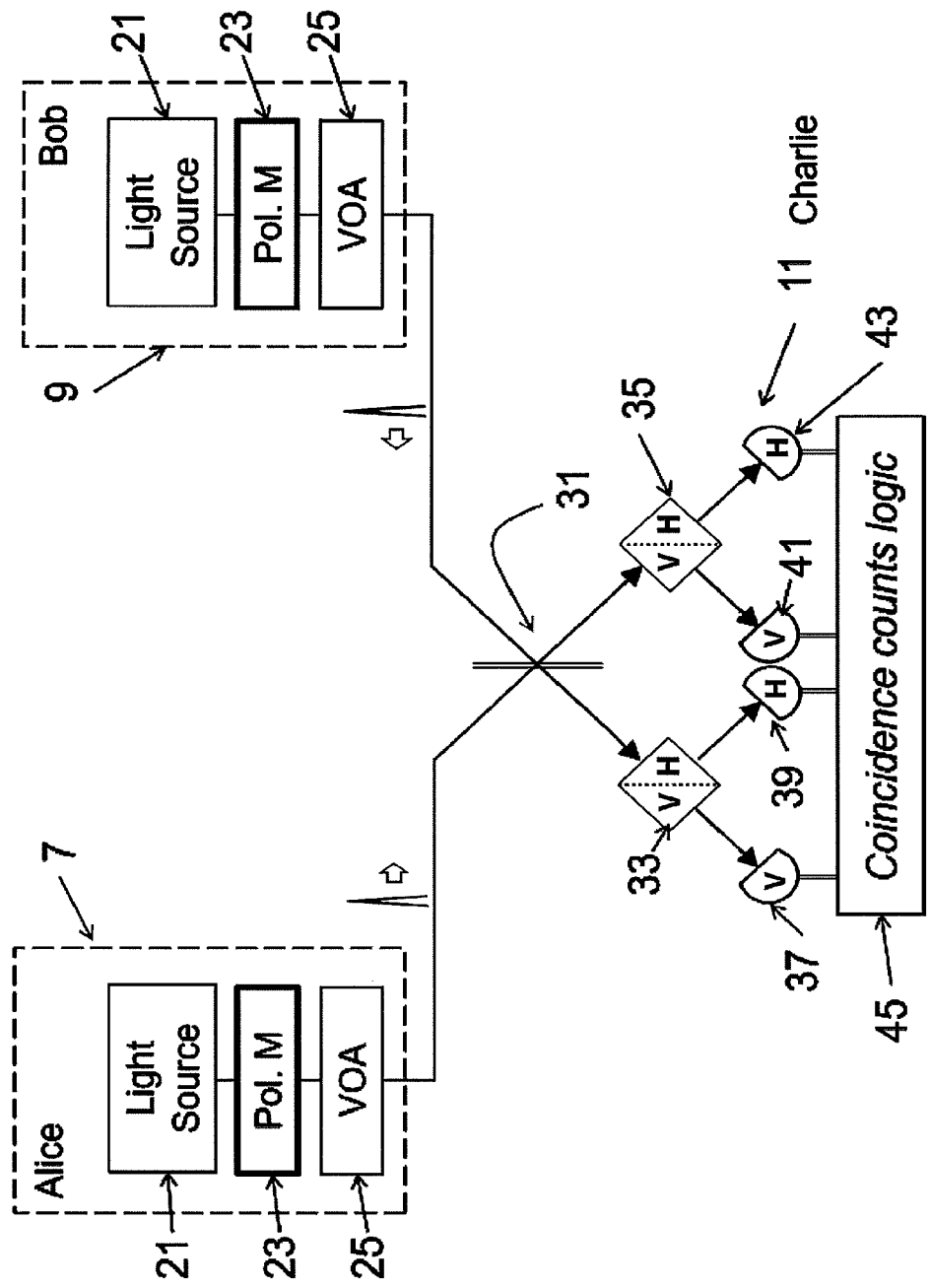
FIG. 3 is a schematic of an MDI QKD system for encoding photons using polarisation.

FIG. 3 will be used to explain MDI QKD first in relation to polarisation. Looking first at Alice 7, Alice's transmitter comprises a light source 21, a polarization modulator 23 and a variable optical attenuator (VOA) 25. The light source 21 outputs a pulse of light to the polarisation modulator 23. The output from the polarisation modulator is then directed into the VOA 25. Alice 7 prepares pulses from light source 21 that are modulated in polarization through polarization modulator (PM) 23. These pulses are then attenuated at the single photon level using variable optical attenuator (VOA) 25. The pulses are then sent to the untrusted receiver 11.

The VOA 25 does not need to be fast and it is not an intensity modulator. Its role here is attenuating the average light emitted by Alice 7 to the single photon level.

Bob's transmitter 9 is configured in the same manner as Alice's 7 and to avoid any unnecessary repetition like reference numerals will be used to denote like features.

The two optical pulses outputted by Alice 7 and Bob 9 arrive at Charlie's receiver 11. Charlie's receiver 11 comprises an interference unit adapted to cause $2^{nd}$ order interference. The interference unit comprises a non-polarising beam splitter 31 which is positioned to cause interference between a pulse received from Alice 7 and a pulse received from Bob 9. The output from the non-polarising beam splitter is directed along two paths wherein each path terminates in a polarising beam splitter 33, 35. The polarising beam splitters 33, 35 then direct their output into pairs of single photon detectors 37, 39, 41, 43. This arrangement makes is possible to determine whether a horizontally or vertically polarised photon has been directed from one of the two paths from the non-polarising beam splitter 31.

A processor 45 is connected to the four detectors 37, 39, 41, 43 which is adapted to determine if two of the detectors register a photon at the same time.

A successful $2^{nd}$-order interference occurs when two of the four of Charlie's detectors 37, 39, 41, 43 click in coincidence, i.e., at the same time, compatibly with the experimental setup. Two detectors clicking are indicative of the presence of at least two photons interfering on Charlie's beam splitter 31.

The processor 45 is committed to record such instances where two detectors click in coincidence. Charlie 11 will declare in the public discussion which detectors clicked, for each pair of light pulses sent by Alice 7 and Bob 9. After that Alice 7 and Bob 9 announce their bases. From the announcements, Alice 7 and Bob 9 can reconstruct each other's encoding and therefore distil a common quantum key. On the other hand, Charlie 11 cannot reconstruct the bits owned by Alice 7 and Bob 9, because his measurement can only tell him if the bits are equal (i.e. "00" or "11") or different (i.e. "01" or "10"), but not which bit is owned by Alice 7 and which by Bob 9.

The polarization-based MDI QKD does not set any requirement on the electromagnetic phase of the light emitted by the users. However, if the light is phase-randomised, the users can run the so-called "decoy-state protocol", which dramatically increases the distance of QKD and MDI QKD respect to other schemes where the light displays a constant or a slowly varying electromagnetic phase. The mathematics that underlies the decoy state protocol exploits properties related to using true single photons in the communication. However, in practice, a laser source emitting coherent states is used. Phase randomisation is then necessary to make coherent states "equivalent" to single photons.

Figure 4:
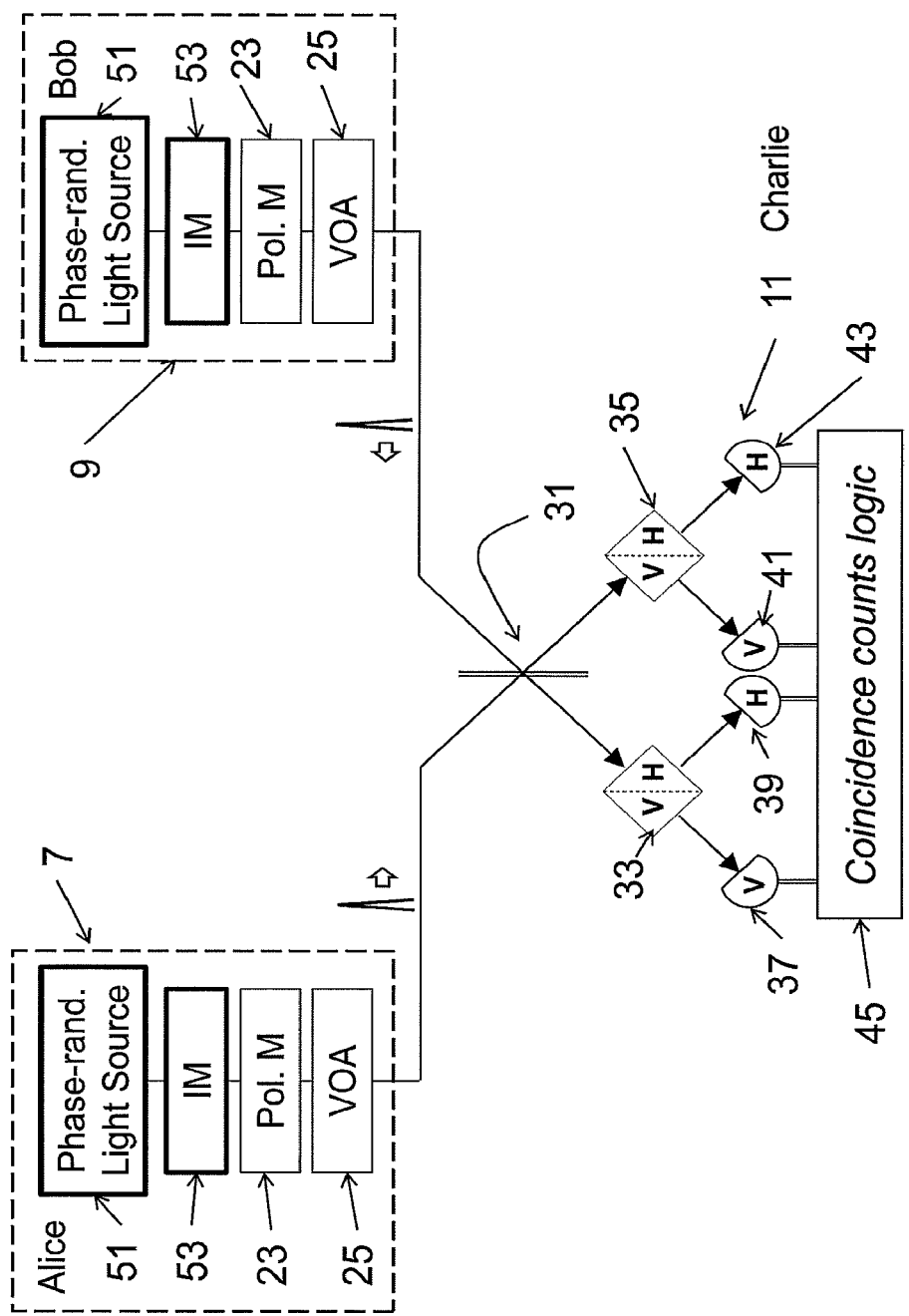
FIG. 4 is a schematic of an MDI QKD system which operates using polarisation and the so-called decoy state protocol.

The schematics for a decoy-state polarization-based MDI QKD are shown in FIG. 4. To avoid any unnecessary repetition, like reference numerals are used to denote like features. The light sources 21 from FIG. 3 have been replaced with a phase-randomised light source 51 and an intensity modulator (IM) 53. The phase-randomised light source 51, is a light source generating a plurality of pulses, each displaying a random electromagnetic phase if compared to the other pulses. The IM 53, is a device capable of modulating the intensity of each pulse emitted by the phase-randomised light source. In decoy-state MDI QKD, the public discussion includes also the announcement of the intensities prepared by Alice and Bob through their IMs 53. By also communicating the intensities, it is possible for Alice and Bob to more effectively determine the presence of an eavesdropper who has used a photon number splitting (PNS) attack. In a PNS attack, the eavesdropper attempts to split off a single photon from a weak light pulse used to communicate the key. Although each pulse should contain a single photon, some pulses will contain more than one photon and this makes a QKD system vulnerable to the PNS attack.

Figure 5A:
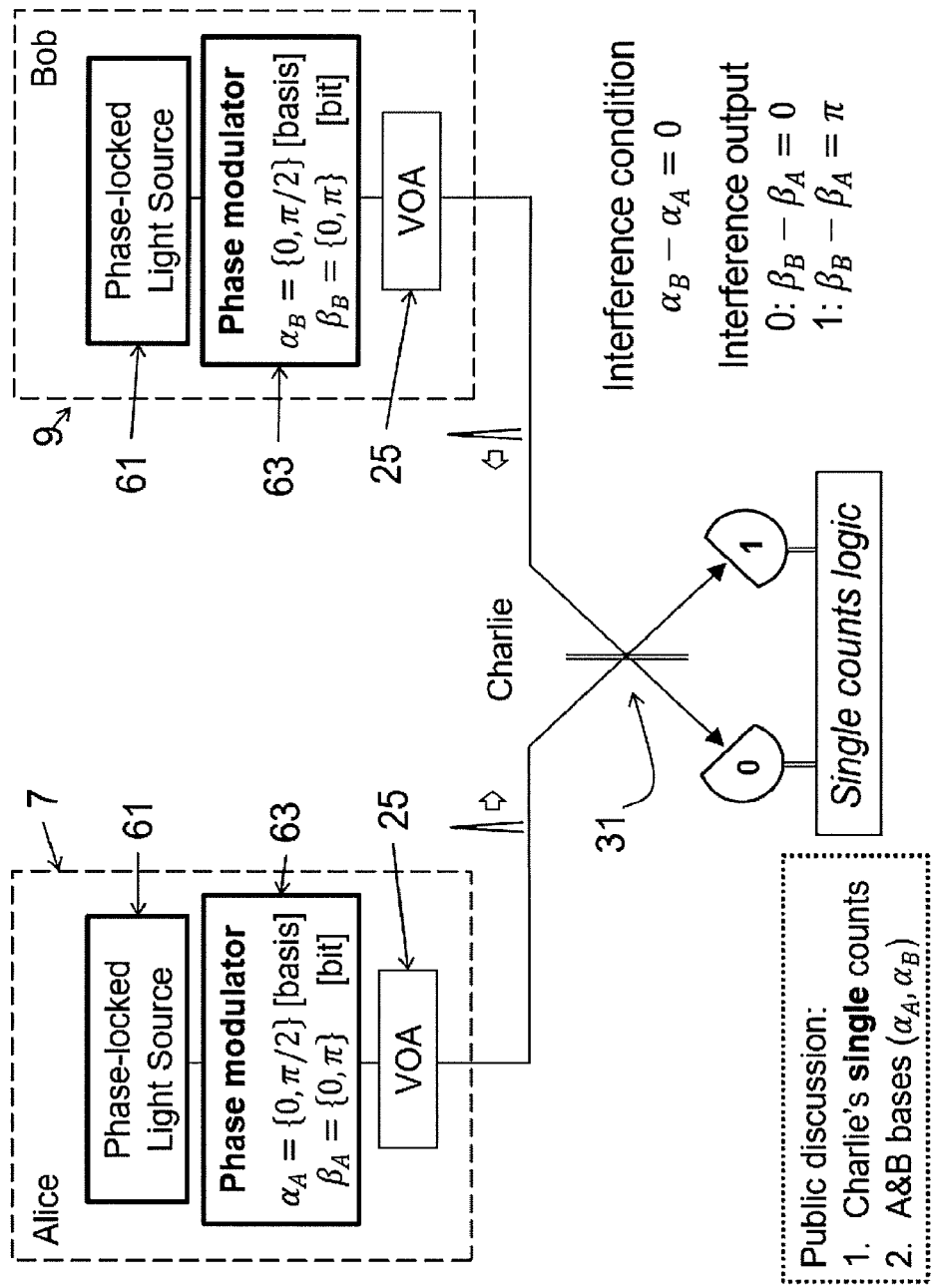
FIG. 5(a) is a schematic of an MDI QKD system implemented using phase.

FIG. 5(a) shows a variant of the MDI QKD scheme of FIG. 4 and here, rather than using the polarization of a photon to encode information, the electromagnetic phase of the photon is used.

FIG. 5(a) shows a phase-based MDI QKD scheme. To simplify the description, it is assumed that all the electromagnetic phases in the scheme are perfectly stable.

In this simplified scenario, a common fixed phase reference $\varphi_R$ is available to all the users all the time. As the phase reference is common to everybody and constant, it can be assumed without loss of generality that $\varphi_R=0$. Alice 5 has a phase locked light source 61 and a phase modulator 63. The output of the phase modulator 63 is attenuated using variable optical attenuator (VOA) 25 which is the same as previously described.

Alice prepares a first light pulse using her light source 61 to produce a pulse and then encodes her secret information in the electromagnetic phase difference between the light pulse and the phase reference $\varphi_R$ using phase modulator 63. In this particular example, the encoding of the BB84 protocol [C. H. Bennett and G. Brassard, *Proc. of IEEE Int. Conf. on Comp. Sys. Sign. Process.* (IEEE, New York, 1984), pp. 175-179] is considered, where Alice encodes a random "basis", either Z or X, by selecting a phase value $\alpha_A=0$ or $\alpha_A=\pi/2$, respectively, and a random "bit", either 0 or 1, by selecting a phase value $\beta_A=0$ or $\beta_A=\pi$, respectively.

The optical pulse prepared by Alice will then carry a total electromagnetic phase $\alpha_A+\beta_A$. Then Alice moves to the next pulse and repeats the procedure. Bob performs similar steps with phases $\alpha_B$ and $\beta_B$. The total electromagnetic phases of the pulses exiting Alice and Bob's modules are indicated by $\varphi_A$ and $\varphi_B$ respectively:

Alice: $\varphi_A=\alpha_A+\beta_A$ (1)

Bob: $\varphi_B=\alpha_B+\beta_B$ (2)

Since all the phases are stable, Alice 7 and Bob's 9 phase values remain constant during the propagation through the communication channels. When the optical pulses reach Charlie's non-polarising beam splitter, they undergo a so-called "$1^{st}$-order interference", which is of the same kind as the one seen in a double-slit interference experiment and in standard QKD. This means that in order to interfere deterministically, the phases of Alice and Bob's pulses should satisfy the following interference condition:

$\varphi_B-\varphi_A=0 \mod \pi$, (3)

where "mod $\pi$" means "addition modulo $\pi$". As the phase values associated to the bits are either 0 or $\pi$, Eq. (3) reduces in this case to the following condition about the matching condition of the bases:

$\varphi_B-\alpha_A=0$. (4)

If this condition is satisfied, then when $\beta_B-\beta_A=0$, (5)

the light emerges from the port connected to detector 0, whereas when $\beta_B-\beta_A=\pi$, (6)

the light emerges from the port connected to detector 1. Therefore, after Charlie announces his counts and after Alice and Bob announce their bases, Alice and Bob can reconstruct the bit value prepared by the other user in all cases where the bases match. In case of non-matching bases, the users discard the data, as in the standard BB84 protocol. In an embodiment, Charlie announces all the instances where exactly 1 of his detectors clicked. For these instances he also announces which detector clicked.

Another possibility is that Charlie announces also when both his detectors clicked. These double clicks are useless for the final key and can be treated in two ways:
1) Alice and Bob discard the runs where Charlie announced the double clicks;
2) Alice and Bob transform a double click into a single click by deciding at random which of Charlie's detectors clicked.

The security is the same in both cases.

Phase-based MDI QKD is similar to a phase-based QKD, with the difference that Alice 7 and Bob 9 are both transmitters, so all the vulnerabilities of a quantum receiver are removed, as in MDI QKD. Moreover, because the light pulses undergo $1^{st}$-order interference rather than 2nd-order interference, the successful result can be determined using only one of Charlie's detectors rather than two. This allows for a much higher detection rate, because single counts are far more numerous than coincidence counts. Finally, the visibility of the $1^{st}$-order interference between two light pulses generated by ordinary lasers can be as high as 100%, whereas it is limited to 50% in the case of a $2^{nd}$-order interference from laser pulses. This makes lasers negatively affect the estimation of the secure key rate in ordinary MDI QKD. On the contrary, lasers can be effectively employed in phase-based MDI QKD, as the $1^{st}$-order interference visibility remains unaffected by their presence.

Figure 5B:
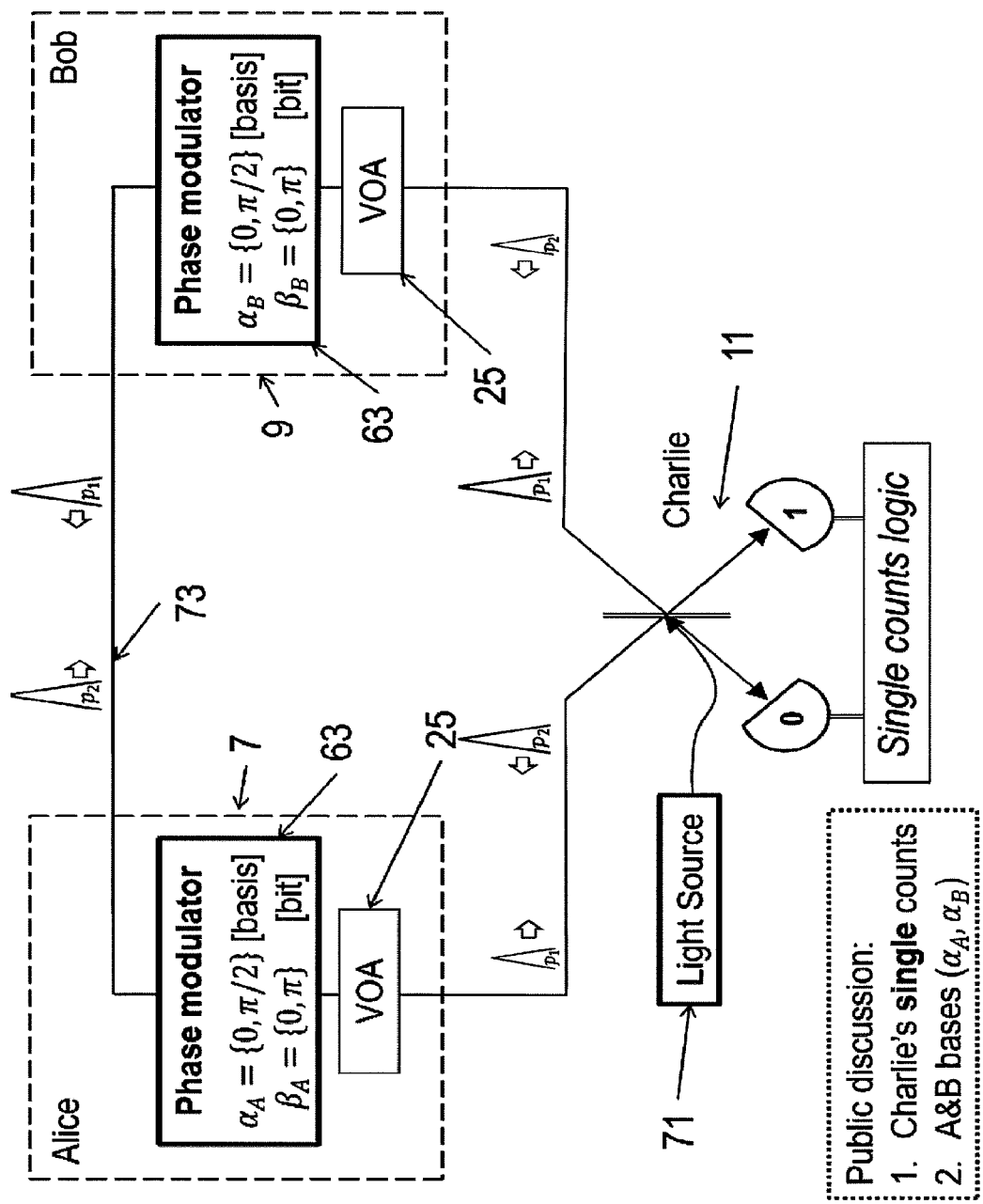
FIG. 5(b) is a schematic of a closed loop MDI QKD system implemented using phase.

FIG. 5(b) shows a variation on the system of FIG. 5(a). In this scheme, Charlie 11 acts as both the central detection unit and the central transmitter. Charlie prepares an optical pulse from a light source 71 and sends it on his beam splitter, which splits it into two sub-pulses p1, directed to Bob 9, and p2, directed to Alice 7. The pulses pass through Alice 7 and Bob's 9 modules a first time. Then they emerge unattenuated and unmodulated on an additional optical channel 73 deployed between the users Alice 7 and Bob 9. On this channel 73, the optical pulse p1, emerged from Bob's module 9, moves towards Alice's module 7, whereas the optical pulse p2, emerged from Alice's module 7, moves towards Bob's module 9. The optical pulses enter Alice 7 and Bob's 9 modules and there they are encoded with basis information and bit information, as in phase-based MDI-QKD in FIG. 5(a) using Alice and Bob's phase modulators 63. Then they are attenuated at the single photon level by the variable optical attenuator (VOA) 25 and redirected to Charlie.

Upon reaching Charlie, they will undergo first-order interference in Charlie's beam splitter, as in phase-based MDI-QKD. This configuration can be realised in many different ways, without changing the working principle.

The addition of the extra optical channel between Alice and Bob allows to implement a closed-loop communication channel between Alice 7, Bob 9 and Charlie 11. In terms of optics, the closed loop represents a Sagnac interferometer, which displays excellent stability in phase. The optical pulses propagating in the same loop experience the same phase and polarization impairments and return to the initial point at the same time. When they return to the initial beam splitter and interfere there, all the impairments are automatically cancelled.

In the phase-based MDI QKD schemes of FIGS. 5(a) and (b), the value of the phase reference is available to Charlie.

In the scheme of FIG. 5(a) the phase reference $\varphi_R$ is available to all users, including Charlie 11. In the scheme of FIG. 5(b), it is Charlie 11 to send the initial optical pulses, so he knows their phase. Charlie 11 could be a malevolent party and the crux of QKD and especially MDI-QKD is guaranteeing a secure communication between Alice 7 and Bob 9 irrespective of Charlie's 11 technological means. However, the knowledge of the reference phase value is very useful to Charlie 11, as he can now perform powerful phase-locked measurements to steal information from Alice 7 and Bob 9. In this case, the security of the system can be restored at the expenses of the performance of the scheme, which is severely reduced. For example, if the random values encoded by Alice and Bob are limited to the four values of the BB84 protocol, two for the bases Z and X ($\alpha$=0 and $\alpha$=$\pi$/2 respectively) and two for the bits 0 and 1 ($\beta$=0 and $\beta$=$\pi$ respectively), a phase-based scheme equivalent to that of FIGS. 5(a) and 5(b) ceases to deliver quantum keys if the users are just a few tens of kilometres far apart.

One reason for this is that the schemes in FIGS. 5(a) and 5(b) and all the phase-based MDI QKD schemes in the prior art only implement random values for the basis and the bit choices, not for the global phase.

On the contrary, returning now to FIG. 1, a system is shown with a phase randomiser 81 in Alice 7 and Bob's 9 modules, so to randomise the global phase, i.e., the phase of the optical pulses with respect to the reference phase available to Charlie 11. Also, the public discussion typical of QKD and QKD-like protocols to allow Alice 7 and Bob 9 reconcile their random relative phases in the post-processing stage has been modified in the scheme of FIG. 1, as discussed later, to let the users reconcile the random global phases implemented by their phase randomisers.

The phase randomiser 81 assigns to each optical pulse an electromagnetic phase randomly selected from values symmetrically distributed over the whole interval (0, 2$\pi$). This greatly limits the eavesdropper, which could even be Charlie 11, and increases the operational range of phase-based MDI QKD. This is because the phase could be a useful resource for Eve (or for an evil Charlie). Knowing the phase improves Eve's measurement, i.e., Eve gains more information. To remove this larger information, the users need to perform more privacy amplification, thus reducing the performance of the QKD system (ie its rate or its operational range).

The phase randomisation removes the knowledge of the global phase from Eve's hands, so she now gains less information from her measurement, the users perform less privacy amplification and the performance of the QKD system improves.

A fully random choice of the optical pulses' phase allows the implementation of the "decoy-state" protocol (as explained with reference to FIG. 4) in a phase-based MDI-QKD, dramatically increasing its operational range.

The presence of a phase randomiser in a phase-based MDI QKD is quite counterintuitive. The common reasoning is that if the phase of the optical pulses is random, the pulses cannot perform $1^{st}$-order interference at Charlie's beam splitter 31. However, this is only partially true, as the system measures so called "pulse by pulse interference", where the interference occurs for each single pair of optical pulses, one coming from Alice 7 and the other coming from Bob 9. Despite the phase being random between different pairs of optical pulses, in the same pair of pulses interference can still occur and provide useful information. For clarity, events are processed one by one where "one event" represented by the emission (by Alice and Bob) and then detection (by Charlie) of a single pair of optical pulses and not the repetition of this process many times, which would provide an "average result".

The phase of each pair of pulses arriving on Charlie's beam splitter 31 is random with respect to the previous pair of pulses, or respect to the next pair of pulses, or respect to any other pair of pulses emitted by the users. However, in each pair, the two pulses interacting on beam splitter 31 have a definite phase relation, which determines where the light will go, whether on detector 1 or 2. The next pair of pulses will have a different phase relation, so the outcome will be different. Nevertheless their relative phase will still determine where the light will go in that event. An absence of "pulse-by-pulse" interference would be having the light directed to one detector or another irrespective of the relative phase of the two pulses arriving on BS 31. If this is the case, the outcome is not related to Alice and Bob's preparation and there would be no useful information to extract from it.

How full phase randomisation is compatible with phase-based MDI QKD, which requires fixed phase relations as those in Eqs. (3)-(6) will now be explained.

It should be noted that the phase conditions in Eqs. (3)-(6) do not need to be satisfied for all the optical pulses. If they are satisfied for a big enough subset of the pulses prepared by Alice and Bob, it is still possible to perform phase-based MDI-QKD on this sub set.

FIG. 1 shows an implementation of "phase-randomised phase-based MDI QKD" of "PMDI" as it will be termed here, is presented. Alice 7 and Bob 9 impart to each optical pulse random phases $\rho_A$ and $\rho_B$, respectively, chosen in the interval (0,2$\pi$), using a device that will be referred to as a "phase randomiser" 81. In an example, a phase randomised is a fast phase modulator working at the same clock rate as the light source, fed with a fresh random number for each clock cycle. The source of random numbers can be a true random number generator (RNG), which loads random numbers in a memory unit (not shown) connected with the phase modulator The phase randomiser 81 is supplied with light pulses from the phase locked light source 61 and randomises the phase of the optical pulses arriving from the phase-locked light source 61, over the whole interval allowed for a phase value.

As before, $\varphi_A$ and $\varphi_B$ are used to indicate the total electromagnetic phases of a pair of pulses exiting Alice 7 and Bob's 9 modules, which now also include the random phases $\rho_A$ and $\rho_B$. Thus, these can be presented as:

$$\text{Alice: } \varphi_A = \alpha_A + \beta_A + \rho_A, \qquad (7)$$

$$\text{Bob: } \varphi_B = \alpha_B + \beta_B + \rho_B. \qquad (8)$$

In most cases, the phase values $\rho_A$ and $\rho_B$ will be different and Alice 7 and Bob 9 will hardly be able to satisfy the interference condition, Eq. (3), and distil a common bit.

However, it can happen for a pair of optical pulses, or more pairs, that the phase values coincide:

$$\rho_A = \rho_B = \rho^*. \qquad (9)$$

When this happen, Alice and Bob are perfectly phase-aligned. Then, if the bases are matched too, $$\alpha_A = \alpha_B = \alpha^*, \qquad (10)$$

the pulses satisfy the interference condition Eq. (3) and the users can distil a common bit using Eqs. (5), (6). Actually, even if the bases do not coincide ($\alpha_A \neq \alpha_B$) and the random phases are different ($\rho_A \neq \rho_B$), the users can still satisfy Eq. (3) if the following condition holds:

$$\alpha_A + \rho_A = (\alpha_B + \rho_B) \bmod \pi. \quad (11)$$

Eq. (11) then represents a generalisation of Eq. (3), expressing the interference condition for a scheme that includes phase randomisation. Whenever it is satisfied, the users can distil common bits using Eqs. (5), (6). When it is not satisfied, the users discard the data. Thus, not only is data-discarding reconciliation performed for the random bases, it is also performed for random global phases.

It is apparent that in order to verify Eq. (11) the users need to know the values of all the quantities appearing in the equation, or at least the cumulative quantities $\alpha_A + \rho_A$ and $\alpha_B + \rho_B$ appearing in the L.H.S. and R.H.S. of Eq. (11), respectively. For that purpose, they include in the public discussion the announcement of the phases $\rho_A$ and $\rho_B$. As usual in QKD and MDI QKD, the announcements in the public discussion should be made in a strict chronological order. In particular, Alice and Bob's announcements should always start only after Charlie's announcement has been completed.

FIG. 6 is a table with headings showing the information that is disclosed by Charlie, Alice and Bob. A time arrow is shown running along the bottom of the table in the order of the headings to demonstrate the order in which Charlie, Alice and Bob disclose the relevant information.

First, Charlie announces for which measurements one detector fired and which of his detectors (termed D0 and D1 in FIG. 6) fired. Next, Alice and Bob reveal the phase applied by the phase randomiser. All measurements where $\rho_A \neq \rho_B \bmod \pi$ are discarded.

Next, one of Alice or Bob reveal their basis and the other who has not revealed their basis advises which of the measurements to keep. (Measurements that have not been made in the same bases are discarded.) Charlie's measurement will only reveal if Alice and Bob encoded their photons using the same bit values (00 or 11) or different bit values (01 or 10), but will not reveal the absolute value of each bit (0 or 1). Therefore, although Charlie will know the global phase, the basis and which detector fired, he will not know the bit value. This information is available to Alice and Bob though, who know the absolute value of their bit and learn from Charlie if the two bits were equal or different, so each of them can reconstruct the other party's bit value.

The announcement of bases and phases (columns 3 and 2 in the table of FIG. 6 respectively) can be cumulated in a single announcement of the quantity $\alpha_A + \rho_A$ for Alice and $\alpha_B + \rho_B$ for Bob, thus reducing the duration of the public discussion. The users can refer to the table in FIG. 6 to calculate their bit values depending on the values of the other quantities previously announced.

Figure 7:
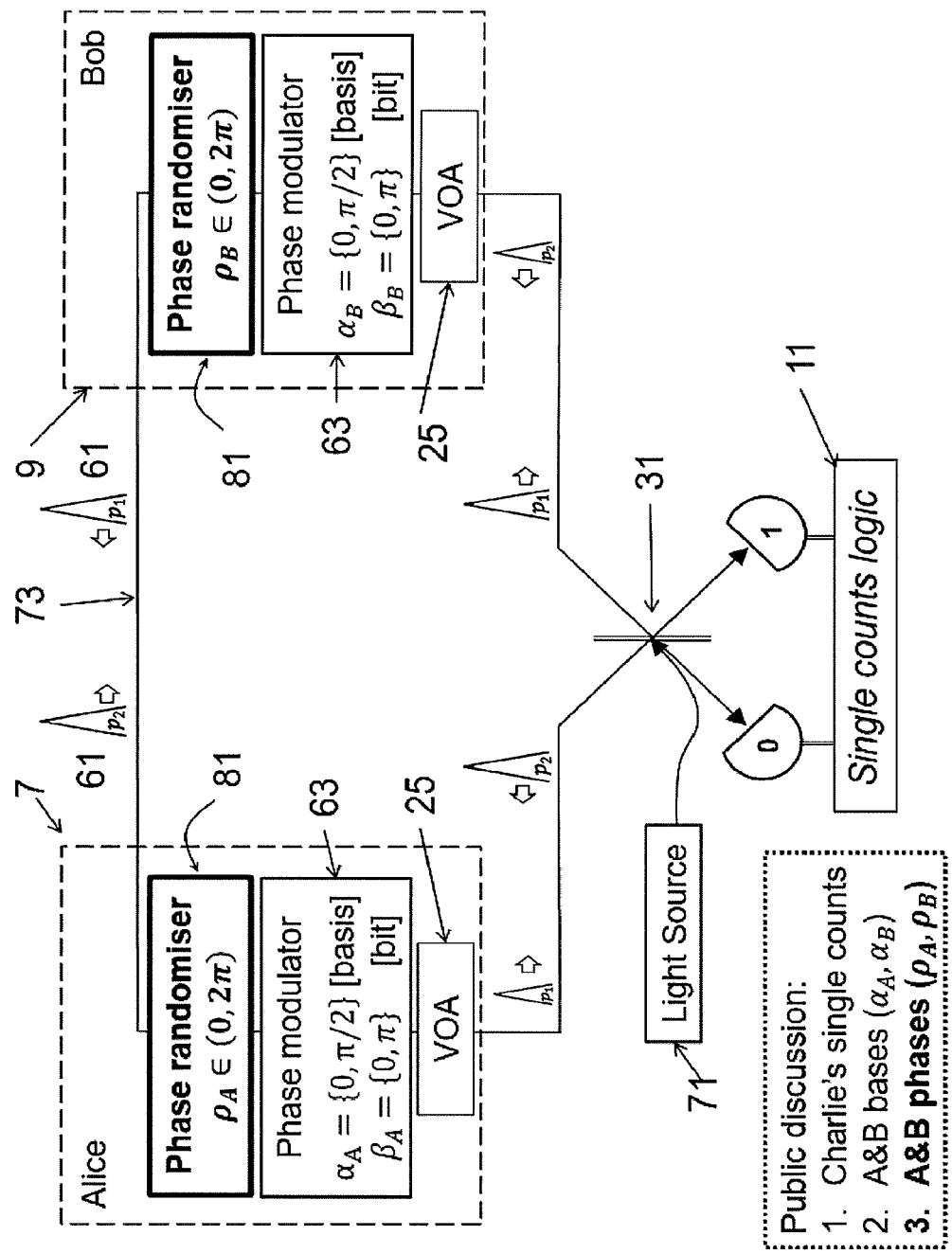
FIG. 7 is a schematic of a closed loop MDT QKD system in accordance with an embodiment.

FIG. 7 shows a variation on the system of FIG. 1 where the phase-based MDI-QKD with a phase randomiser is incorporated into a closed loop system. A basic non-phase randomised MDI-QKD system has been explained with reference to FIG. 5(b).

To avoid any unnecessary repetition, like reference numerals will be used to denote like features. Alice 7 and Bob 9 use their phase randomisers to randomise the phase of the optical pulses received from the common optical channel 73 with respect to the phase fixed by Charlie 11.

As before, Charlie 11 acts as both the central detection unit and the central transmitter. Charlie prepares an optical pulse from a light source 71 and sends it on his beam splitter, which splits it into two sub-pulses p1, directed to Bob 9, and p2, directed to Alice 7. The pulses pass through Alice 7 and Bob's 9 modules a first time.

Then they emerge unattenuated and unmodulated on an additional optical channel 73 deployed between the users Alice 7 and Bob 9. On this channel 73, the optical pulse p1, emerged from Bob's module 9, moves towards Alice's module 7, whereas the optical pulse p2, emerged from Alice's module 7, moves towards Bob's module 9. The optical pulses enter Alice 7 and Bob's 9 modules and there, first, they are passed through phase randomisers 81 followed by phase modulators 63. Finally, the pulses are attenuated at the single photon level by the variable optical attenuator (VOA) 25 and redirected to Charlie 11.

Upon reaching Charlie, they will undergo first-order interference in Charlie's beam splitter, as in phase-based MDI-QKD. This configuration can be realised in many different ways, without changing the working principle.

The addition of the extra optical channel between Alice and Bob allows the implementation of a closed-loop communication channel between Alice 7, Bob 9 and Charlie 11. In terms of optics, the closed loop represents a Sagnac interferometer, which displays excellent stability in phase. The optical pulses propagating in the same loop experience the same phase and polarization impairments and return to the initial point at the same time. When they return to the initial beam splitter and interfere there, all the impairments are automatically cancelled.

Then, the users will reveal their random phases during the public discussion, as discussed in relation to FIG. 6.

Figures 8A, 8B:
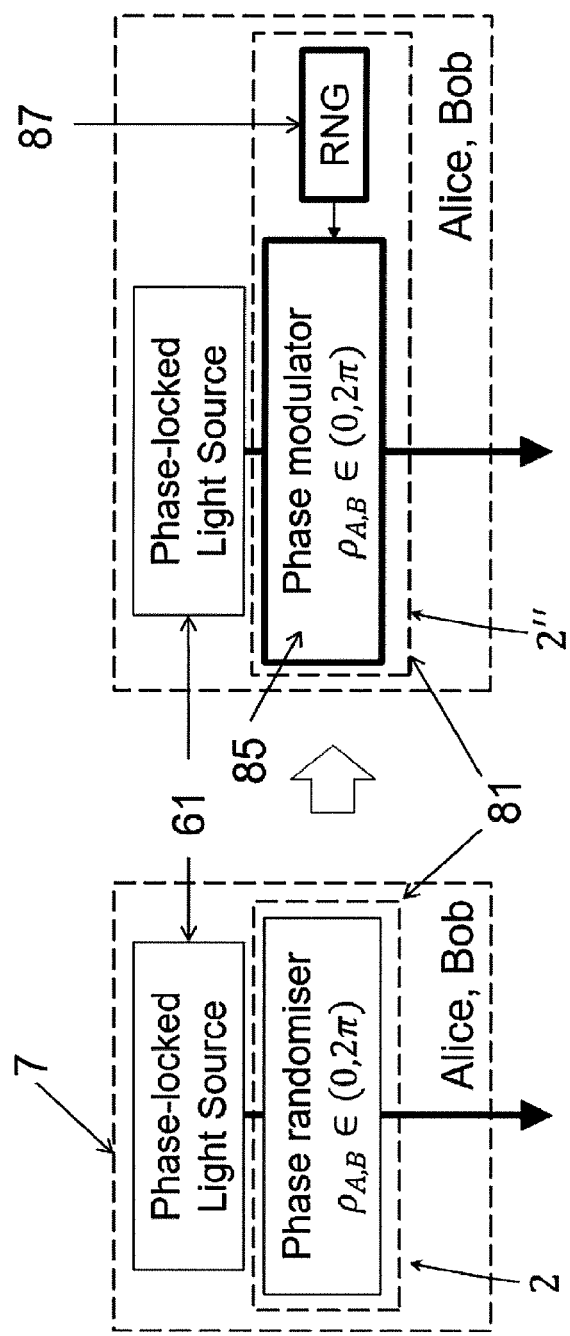
FIG. 8(a) is a diagram of a unit used to actively randomise the phase in the systems of FIGS. 1 and 8.
FIG. 8(b) shows a variation on the unit of FIG. 8(a)

FIG. 8 schematically demonstrates an active way to randomise the phase. In FIG. 8(a), Alice's unit 7 is shown. However, Bob's unit is identical to Alice's unit. Here, there is a phase locked light source 61 that generates optical pulses with constant phase and outputs them to phase randomiser 81.

One implementation of this is shown in more detail in FIG. 8(b). Here, the phase locked light source 61 outputs optical pulses with constant phase to phase randomiser 81. Phase randomiser 81 comprises a phase modulator 85. The phase modulator 85 works at the same clock rate as the light source 61 and the whole system and changes the phase of each optical pulse, selecting at random one of the phase values according to the input received from a random number generator (RNG) that drives, through a digital-to-analogue (DAC) converter (not shown), the phase modulator.

Figure 9A:
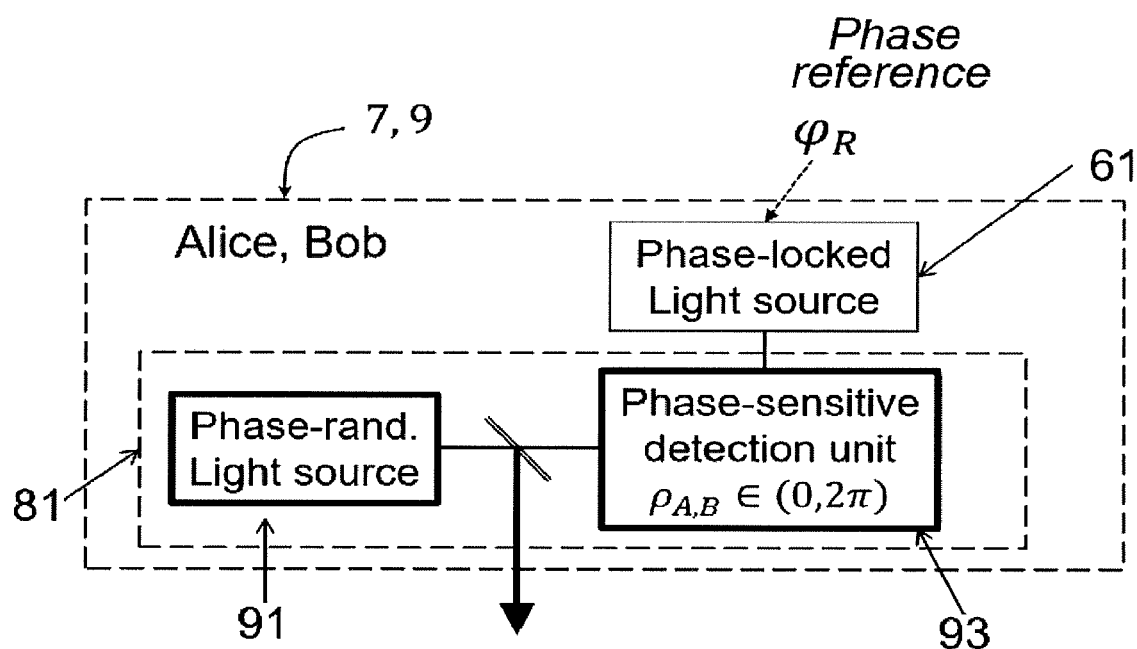
FIG. 9(a) is a diagram of a unit used to passively randomise the phase in the systems of FIGS. 1 and 7.

In FIG. 9(a), there is a schematic of a passive implementation of the phase randomiser, which does not make use of a RNG. Here, the randomness is generated by the phase-randomised light source 91, implemented, e.g., with gain-switched laser diodes or with two laser diodes optically coupled in a master-slave configuration. It has been shown that this kind of lasers naturally exhibit phase randomisation, therefore the emitted light pulses display a random phase $\rho$. A fraction of this light (thick arrow) is reflected by the first beam splitter and is transmitted out of Alice 7 or Bob's 9 unit and towards Charlie 11. The remaining fraction of light, still carrying the same phase $\rho$, is transmitted to a phase-sensitive detection unit 93, designed to measure the unknown phase $\rho$.

Figure 9B:
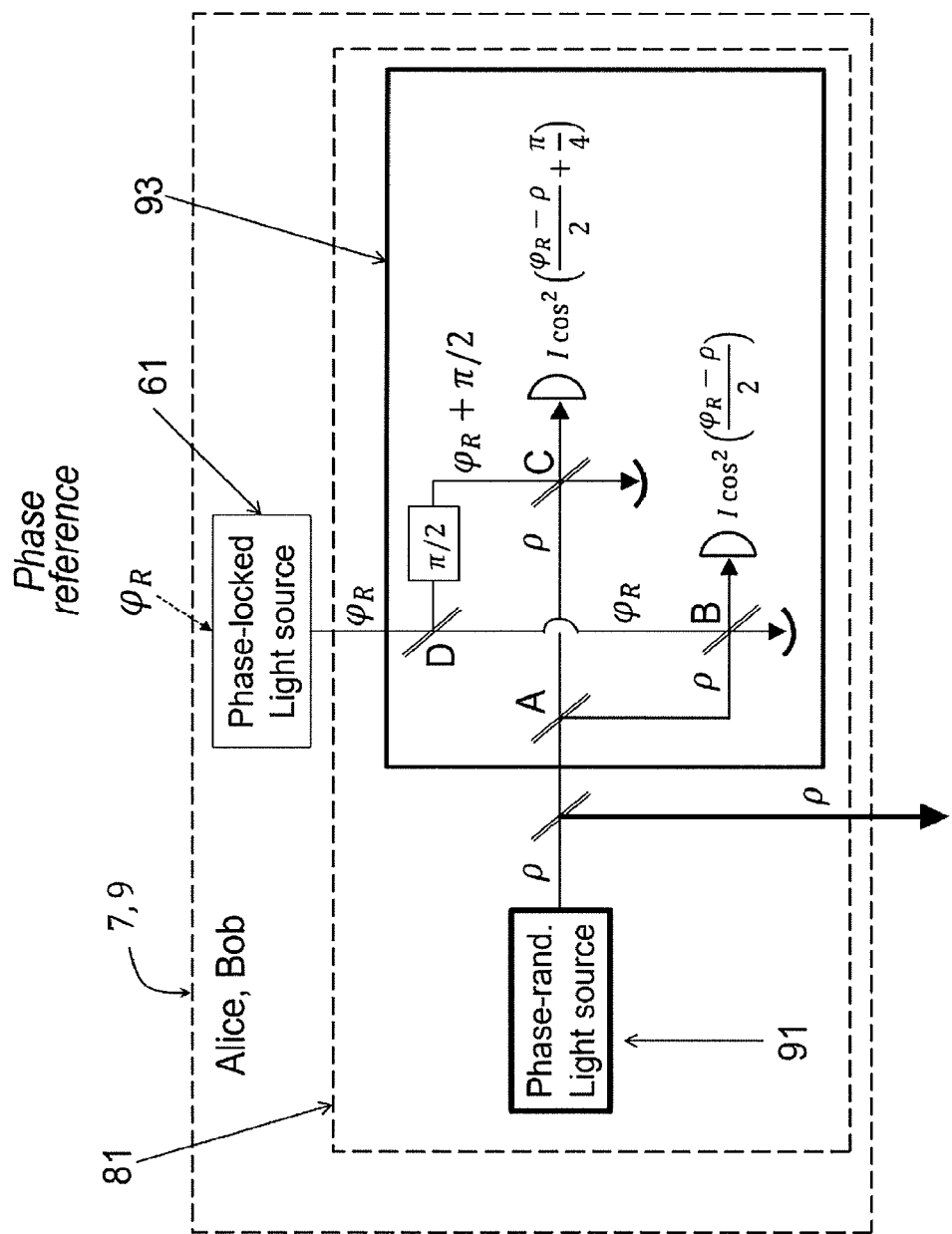
FIG. 9(b) shows the system of FIG. 9(a) in more detail.

The phase-sensitive detection unit 93 as shown in FIG. 9(b) consists of a temperature-stabilised setup, to keep the phase stable over the entire measurement process, with two input paths, various beam splitters, a phase shifter and a pair of detectors. The light carrying the unknown phase $\rho$ is sent on the first input, impinges on beam splitter A and then on two secondary beam splitters B and C, where is combined with the light emitted by the phase-locked light source 61. This light source 61 is locked to the reference phase $\varphi_R$, so the light emitted from it carries a phase $\varphi_R$, which is known to all users. This light is sent on the second input of the phase-sensitive detection unit 93, impinges on beam splitter D and then on the two secondary beam splitters B and C, where is combined with the light emitted by the phase-randomised light source 91. Before reaching beam splitter C, the light carrying the known phase $\varphi_R$ passes through a phase shifter, which adds a phase $\pi/2$ to the light pulse.

The light pulses will interfere on the beam splitters B and C, so the light will be distributed to the output ports of these beam splitter depending on the phase difference of the light beams at the beam splitters input ports. In beam splitter B, the light emerging from the non-blinded port will depend on the difference $\varphi_R - \rho$ through a known relation, shown in the figure. Therefore, by measuring the intensity at this output port, one can infer that the phase difference is either $(\varphi_R - \rho)/2$ or $\pi - (\varphi_R - \rho)/2$. This ambiguity is due to the $\cos^2$ function being monotone only between 0 and $\pi/2$. To remove the ambiguity, one uses the output from the non-blinded port of beam splitter C, which is proportional to either $(\varphi_R - \rho)/2 + \pi/4$ or $3\pi/4 - (\varphi_R - \rho)/2$. By comparing the outcomes from beam splitters B and C, the phase difference $\varphi_R - \rho$ can be unambiguously determined. As $\varphi_R$ is known, this immediately leads to the value of the unknown $\rho$. The knowledge of this phase allows Alice and Bob to perform the phase-based MDI QKD protocol previously described.

The effect of the phase randomiser will be described with reference to FIG. 10. FIG. 10(*a*) shows the effect of the phase randomiser on the light emitted by a light source that is phase-locked to the phase reference $\beta_R$. Such a light source emits optical pulses in the following coherent state:

$$|\sqrt{\mu}\, e^{i\varphi_R}\rangle = \sum_{n=0}^{\infty} e^{-\frac{\mu}{2}} \frac{\sqrt{\mu}^n e^{in\varphi_R}}{\sqrt{n!}} |n\rangle. \quad (12)$$

This state represents a coherent superposition of photon-number states $|n\rangle$ and clearly conveys phase information related to $\varphi_R$. This is represented in the plot of FIG. 10(*a*) with a filled dot in the phase space placed at a distance $\sqrt{\mu}$ from the origin of the axes x and p and raised by an angle $\varphi_R$ over the horizontal axis.

The phase randomiser adds a random phase $\rho$ to the coherent state in Eq. (12). This means that every pulse emerging from Alice and Bob's modules displays a random phase, uncorrelated to the reference phase owned by any other user. Hence, the state seen by the other parties will be given by the following incoherent superposition of number states:

$$\frac{1}{2\pi}\int_0^{2\pi} d\rho |\sqrt{\mu}\, e^{i\varphi_R} e^{i\rho}\rangle\langle\sqrt{\mu}\, e^{i\varphi_R} e^{i\rho}| = \sum_{n=0}^{\infty} e^{-\mu}\frac{\mu}{n!}|n\rangle\langle n|. \quad (13)$$

In the R.H.S. of Eq. (13) there is no sign of the phase term $\varphi_R$ anymore and the result is related to Eq. (12) only through the mean photon number $\mu$. The number state $|n\rangle$ is represented in the plot of FIG. 10(*b*) with a circle with radius $\sqrt{n+\frac{1}{2}}$ centred in the origin of the phase space. There is no phase reference in this case. If the phase of this state is measured, the outcome can be any value in the interval $(0, 2\pi)$. This implies that no unauthorised party, or even Charlie 11, can use the knowledge of the reference phase to break the security of the system if the phase randomiser is in place. This knowledge is prevented to everyone, including Alice (about Bob's random phase) and Bob (about Alice's random phase). However, the legitimate users can reconcile their random phases during the public discussion, thus acquiring a clear advantage over any other illegitimate user.

The only apparent difficulty in the schemes described so far is that the subset of pulses where the interference condition in Eq. (3), or the one in Eq. (11), are satisfied is extremely small, in principle equal to zero. Another aspect of the same problem is that the announcement of $\rho_A$ and $\rho_B$ would require, in theory, an infinite amount of classical communication to be completed. The reason is that $\rho_A$ and $\rho_B$ are real numbers in the interval $(0, 2\pi)$. So, if they have to be announced with infinite precision, an infinite amount of bits is needed. For example, the random phase could accidentally coincide with the irrational number $\pi$, whose representation requires an infinite sequence of digits, in principle.

Figure 11B:
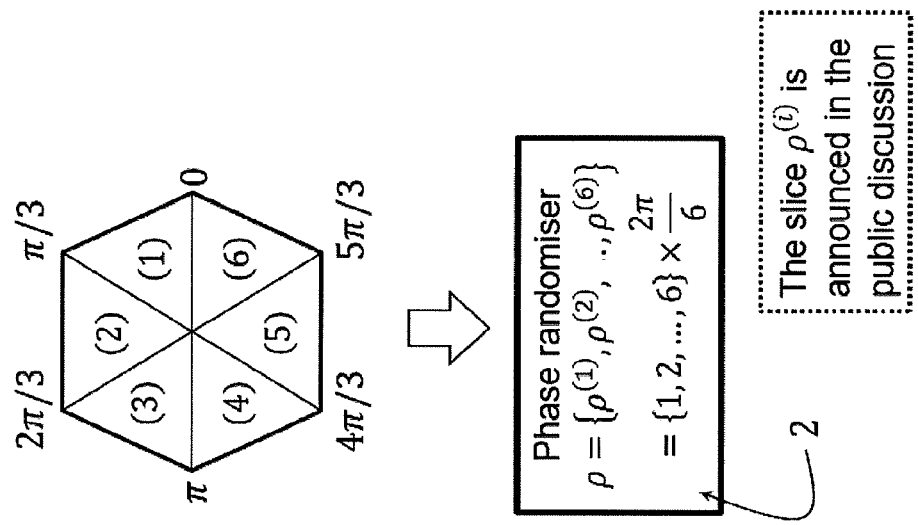
FIGS. 11(a) and 11(b) are schematics showing phase discretization mechanisms.
Figure 11A:
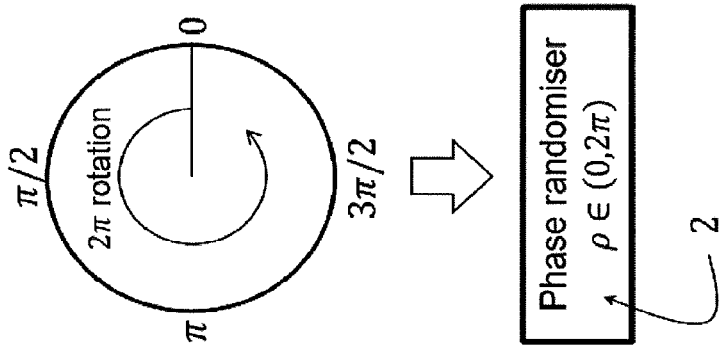

In an embodiment, there is provided a phase discretization mechanism over the interval $(0, 2\pi)$. A way to achieve that is depicted in FIGS. 11(*a*) and (*b*). In FIG. 11(*a*), the circle represents the phase randomisation over the whole interval $(0, 2\pi)$. The users should select at random one of the possible values in the circle, where each phase value is represented by an infinitely narrow slice of the circle. It is therefore unlikely that Alice and Bob will choose exactly the same phase slice in a given run of the phase-based MDI QKD.

In FIG. 11(*b*), the circle is replaced by a polygon, featuring a discrete and finite number of phase slices. Each slice is numbered with a progressive number, from 1 to L. As an example, a hexagon is shown with L=6. The number of slices can be decided beforehand by the users.

During the public discussion, the users will announce the phase slice number $\rho^{(i)}$ rather than the exact phase value selected at random in the interval $(0, 2\pi)$. As the number of slices is L, it only requires a maximum of $\log_2 L$ bits to communicate the slice number during the public discussion. This is very convenient for Alice and Bob, who can quickly reconcile their phase values. Moreover, there is a probability $1/L$ that the announced slice numbers will coincide. In this case, the users can proceed to the next step of the MDI QKD protocol. On the contrary, with probability $1-1/L$, the announced slice numbers will be different and the users discard their data.

If the announced discrete phase values are the same, the users know that their phase alignment is good. The larger L, the better aligned the users are when they announce the same phase slice number. However, the probability that they announce the same phase slice number decreases with L. So, in each experimental implementation there will be an optimal value of L that guarantees the best performance.

When the users announce the same phase number, they know that their actual phase values cannot be more than $2\pi/L$ far apart.

For a phase-based quantum scheme as those described in FIGS. 1 and 7, the quantum bit error rate (QBER) depends on the relative phase alignment and has the following expression:

$$QBER = \sin^2\left(\frac{\varphi_B - \varphi_A}{2}\right), \quad (14)$$

where $\varphi_A$ and $\varphi_B$ have been already introduced and it has been assumed that when the QBER overcomes 0.5, one of the users flips the bit to reconcile their data with the other user.

When there are L slices, each slice has an angular aperture of $2\pi/L$. Assuming that the noise is only due to phase misalignment, the worst-case QBER is obtained in this case when $\varphi_B - \varphi_A = 2\pi/L$ and amounts to:

$$QBER^{worst\ case} = \sin^2\left(\frac{\pi}{L}\right). \qquad (15)$$

For example, if the users divide the interval $(0, 2\pi)$ in $L=12$ slices, each slice will have an angular aperture of $\pi/6$ (30 degrees) and the worst-case QBER according to Eq. (15) is 6.7%. This is less than the typical threshold of the BB84 protocol (11%).

This worst-case QBER is rarely occurring in a real communication, because it requires that both the phase values of Alice and Bob fall right at the edge of the same phase slice. What is more relevant in a real communication is the average QBER, which is given by the following expression:

$$\langle QBER \rangle = \frac{L^2}{4\pi^2} \int_0^{\frac{2\pi}{L}} \int_0^{\frac{2\pi}{L}} \sin^2\left(\frac{\varphi_B - \varphi_A}{2}\right) d\varphi_A d\varphi_B = \frac{1}{2}\left[1 - \frac{\sin^2(\pi/L)}{(\pi/L)^2}\right]. \qquad (16)$$

If we consider the previous case with $L=12$, we obtain an average QBER of 1.13%, which is of real practical use. FIG. 12 is a diagram showing the exact situation for $L=12$. Eq. (16) also shows that in the limit of $L \to \infty$, the average QBER tends to zero whereas for $L=1$ it is equal to 50%.

The discrete phase randomisation just described can be implemented with the passive phase-randomised light source depicted in FIG. 9. In this case, the users will continue to use the phase randomised light source to generate all the phase values in the interval $(0, 2\pi)$. However, they will modify the public discussion and announce only the phase slice number $\rho^{(i)}$ rather than the actual phase value. This guarantees that the phase randomisation remains close-to-perfect, because it is still performed over the continuum of values in the interval $(0, 2\pi)$, but at the same time the users can reconcile their random phases using a discrete and finite subset of phase values, corresponding to the phase slices.

The discretisation of the phase can also be easily done in an active way, using, e.g., the solution depicted in FIG. 8(b). In this case, however, the light source 61 does not implement all the possible phase values in the interval $(0, 2\pi)$, but only the discrete phase values $\rho^{(i)}$ corresponding to the phase slices introduced in FIG. 11(b). So there is a risk that the phase randomisation is not properly implemented, especially when the number of the slices L is too small. To address this, if L is large enough, a discrete phase randomisation closely approaches the continuous one so that the final key rate is close to the one obtained with a complete and perfect phase randomisation.

The users can choose what kind of phase discretization they want to implement, whether the passive one as described with reference to FIG. 9(a) or 9(b) or the active one as described with reference to FIG. 8.

They can plug the chosen box into the phase-based MDI QKD scheme depicted in FIG. 1 as phase randomiser 81 and run the rest of the protocol as already described above.

Regardless of the way phase discretization is implemented, they will always announce the phase slice numbers $\rho_A^{(i)}$ (Alice) and $\rho_B^{(i)}$ (Bob) rather than the exact values of the random phase during the public discussion.

Alternatively, the users can implement the discrete phase randomisation in the setup for PMDI on a closed loop shown in FIG. 7, by replacing the phase randomisers 81 with the phase randomisers shown in FIGS. 8, 9(a) and 9(b).

Irrespective of the scheme adopted, the global phase randomisation entailed by Eq. (13) allows the users to distil secure key bits from their optical pulses. Assuming that the Z basis is the data basis, where the bits of the key are distilled from, and the X basis is the test basis, used to test the channel against eavesdropping, the secure key rate is given by the following equation:

$$R_{GLLP} = p_Z^2\{-f_{EC}Y_Zh(E_Z) + p_{1|Z}y_{1|Z}[1 - h(e_{1|x})]\}. \qquad (17)$$

In the R.H.S. of Eq. (17), the negative term is due to the classical error correction (EC) performed in QKD, whereas the positive term is due to the contribution of single photons to the bits of the cryptographic key. The EC term in Eq. (17) can be precisely measured in a QKD experiment and the expression given in Eq. (17) is an approximation of this measurement's expected result. The term $p_Z$ is the probability that one user chooses the Z basis and it is squared because the users make independent choices about the basis. The term $f_{EC}$ accounts for an imperfect EC and its typical value is 1.15. The term $Y_Z$ is the yield, i.e., the conditional probability that Charlie has a click in his detectors conditional on the users' preparing the optical pulses in the basis Z. The yield is a measurable quantity in a QKD experiment and it amounts to the number of counts registered by Charlie divided by the number of pairs of optical signals emitted by the users. The function h is Shannon's binary entropy, whereas $E_Z$ is the QBER measured by the users in the Z basis. In the second term of Eq. (17), $p_{1|Z}$ is the probability that the users jointly emit a single photon in the basis Z. In this case, the relevant quantity is u, the total intensity of the optical pulses prepared by Alice and Bob. If Alice prepared an intensity $u_A$ and Bob prepared an intensity $u_B$, then $u = u_A + u_B$. A typical value for u is between 0.01 and 1. Typically the users' light sources are attenuated lasers emitting coherent states of light. Then the probability $p_{k|u}$ of getting k photons when the total intensity is u follows a Poisson distribution:

$$p_{k|u} = e^{-u}\frac{u^k}{k!}. \qquad (18)$$

The term $Y_{1|Z}$ in Eq. (17) is the single-photon yield, i.e., the probability that Charlie sees a click when the users jointly emitted a single photon while preparing the intensity u in the basis Z. This quantity cannot be directly measured and must be indirectly estimated. This can be done using the decoy-state technique as explained in the next section, or using the GLLP worst-case estimation:

$$y_{1|Z} = \frac{Y_Z \Omega_Z}{ue^{-u}}, \qquad (19)$$

where $\Omega_Z$ is the fraction of untagged photons in the Z basis $$\Omega_Z = 1 - \frac{p_{multi}}{Y_Z}, \qquad (20)$$

and $p_{multi}$ is the probability that Alice and Bob jointly emit more than one photon. Following the Poisson distribution as in Eq. (18), it equals:

$$p_{multi} = 1 - (1+u)e^{-u} \tag{21}$$

The term $e_{1|X}$ in Eq. (17) is the single-photon QBER in the X basis. Similarly to $Y_{1|Z}$, this quantity cannot be directly measured and must be indirectly estimated. This can be done using the decoy-state technique, described in the next section, or using the GLLP worst-case estimation:

$$e_{1|x} = \frac{E_X}{\Omega_X}, \tag{22}$$

where the X-basis quantities are defined similarly to the Z-basis ones, already defined.

It should be noted that a protocol where Eq. (13) does not hold because the global phase is not randomised does not provide the GLLP secure key rate entailed by Eqs. (17)-(22). In particular, when phase randomisation is not implemented in the system, the phase-error rate in Eq. (22) must be replaced with the following one:

$$e_{1|x} \geq E_Z + 4\Delta'^{(1-\Delta')(1-2E_Z)} + 4(1-2\Delta') \sqrt{\Delta'(1-\Delta')E_Z(1-E_Z)} + \varepsilon, \tag{23}$$

where $\varepsilon$ is a small positive number and $$\Delta' = \frac{\Delta}{\eta u} \tag{24}$$

$$\Delta = \frac{1}{2}\left[1 - e^{-u/2}\left(\cos\frac{u}{2} + \sin\frac{u}{2}\right)\right], \tag{25}$$

u is the mean photon number of the light outputted by the users and $\eta$ is the transmission of the quantum channel. The secure key rate entailed by Eqs. (23)-(25) is much lower than the one entailed by Eqs. (17)-(22). Therefore, in an embodiment, it is advantageous to implement a technique that allows to enforce the phase randomisation of Eq. (13) in the quantum system.

Now the phase-randomised key rate $R_{PMDI}$ can be derived. For that, a perfect phase randomisation as in FIG. 8 is assumed, followed by the announcement of a discrete set of values for the random phases, as, for example, in FIG. 11(b). In this case, the key rate will be the same as GLLP, Eq. (17), but multiplied by a coefficient that takes into account the fact that the users are phase aligned only with probability 1/L when the number of phase slices announced during the public discussion are L:

$$R_{PMDI} = \frac{1}{L} \times R_{GLLP}. \tag{26}$$

The factor 1/L characterises the key rate of PMDI obtained from the present invention. Eq. (26) can be generalised to any other rate different from GLLP, all of them still including the factor 1/L typical of PMDI.

Figure 12A:
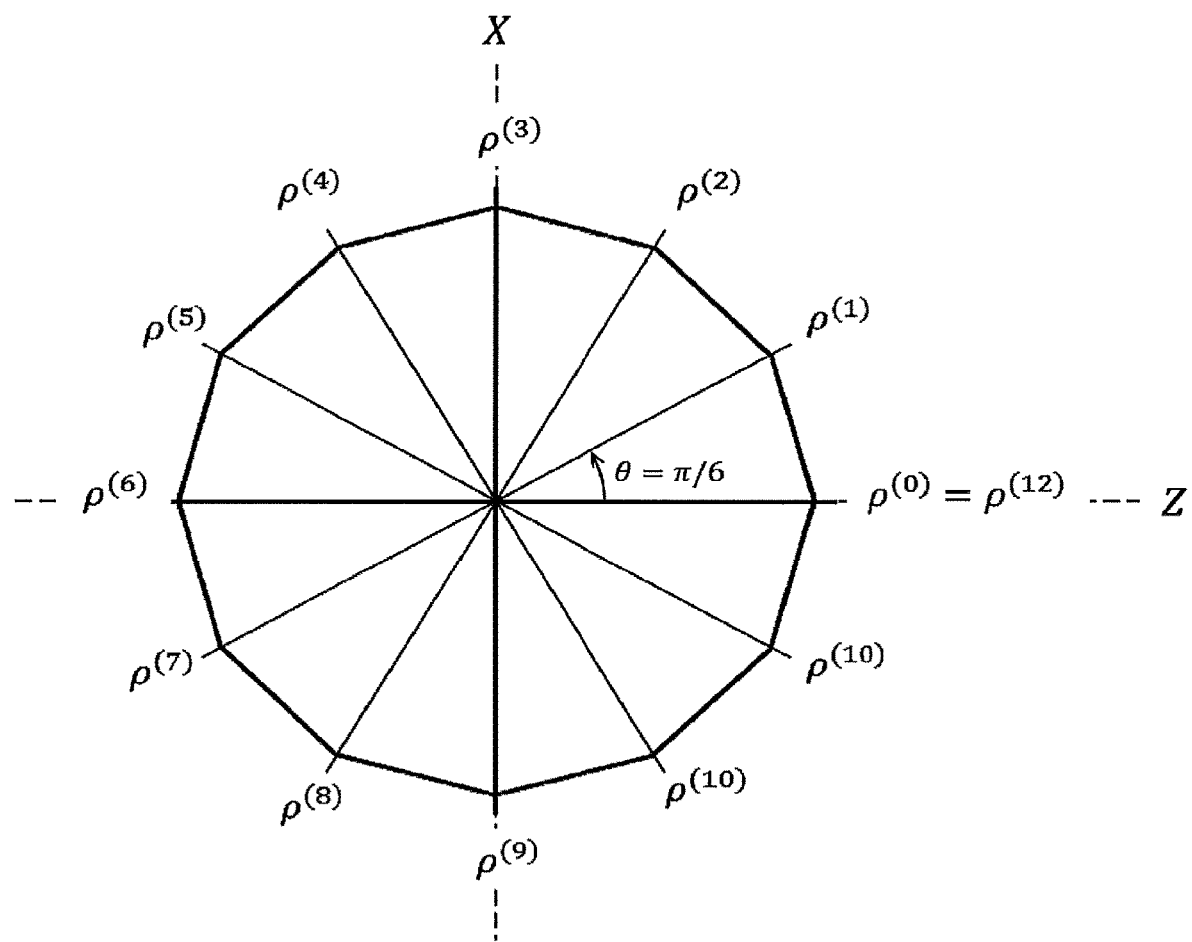
FIG. 12(a) is a further schematic showing a phase discretization mechanism where the phase is split into 12 possible values.
Figure 12B:
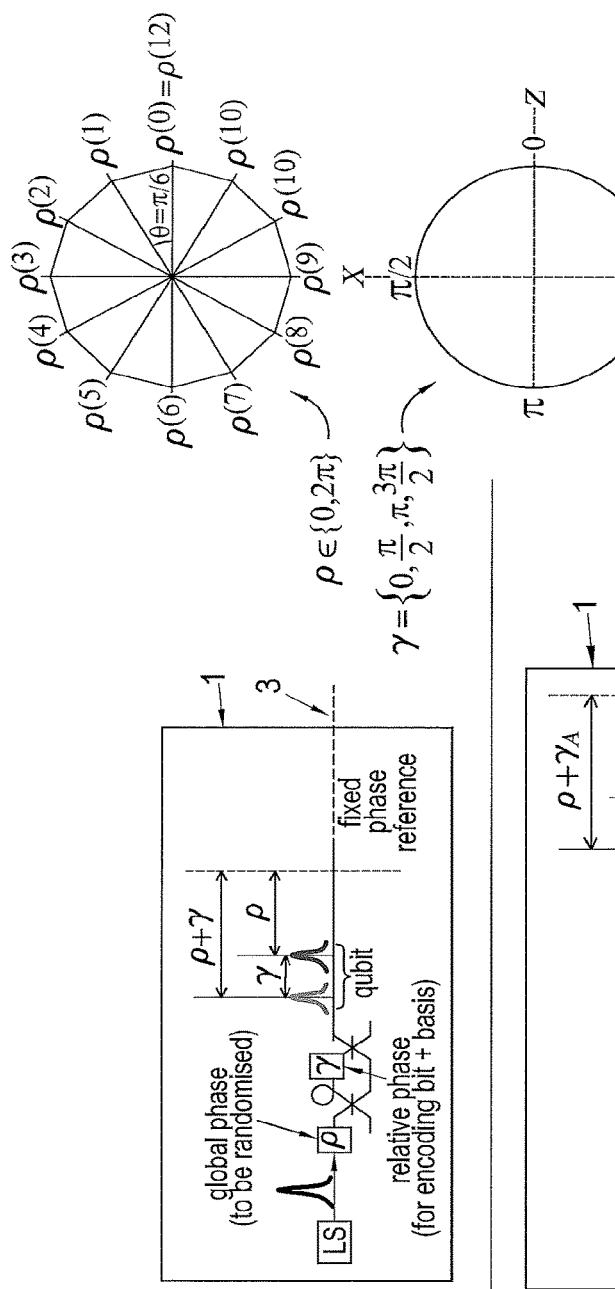
FIGS. 12(b) to 12(d) are diagrams showing the cooperation between the global phase shift and the relative phase shift.
Figure 12C:
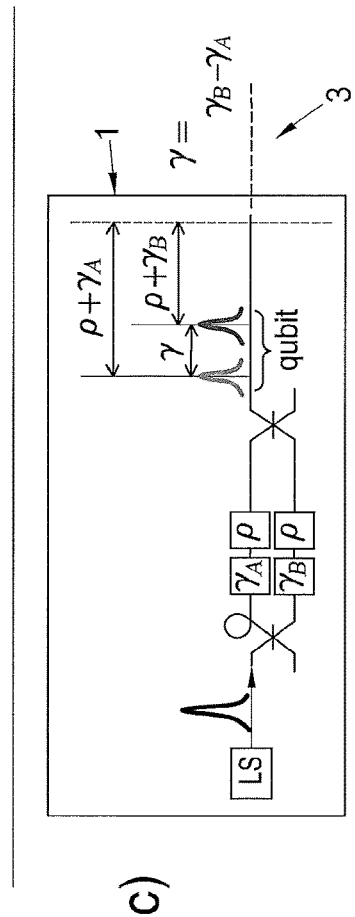
Figure 12D:
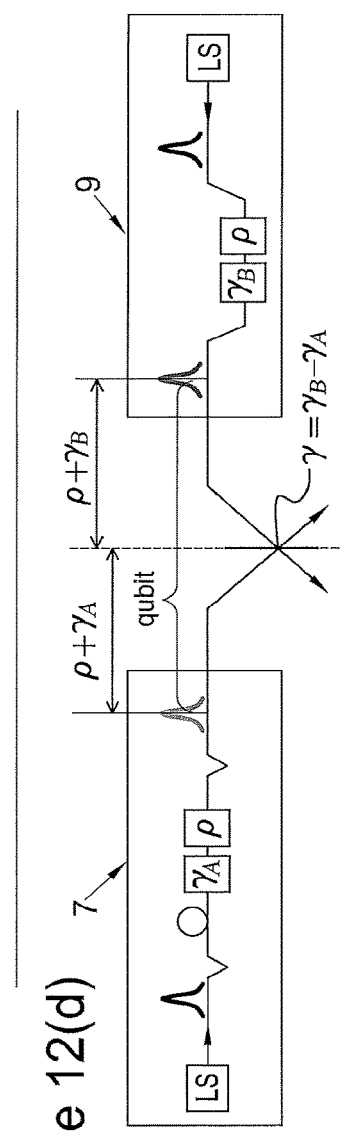

FIGS. 12(b) to 12(d) show the cooperation between the relative and local phase components. In FIG. 12(b) Alice prepares two optical pulses (blue and red) using an Asymmetric Mach-Zehnder Interferometer (AMZI). The global phase $\rho$ is randomised using a phase modulator soon after the light source (LS). This global phase is encoded on the initial pulse (black), so when this pulse is split in two at the first beam splitter, the phase $\rho$ is inherited by the two secondary pulses (blue and red). The blue pulse follows the AMZI's bottom path (shorter) and emerges with a total phase $\rho$, counting from a fixed reference phase. The red pulse follows the top arm (longer) so it also passes through the phase modulator acquiring an additional phase $\gamma$ (the relative phase). It then emerges with a total phase $\rho+\gamma$. The information (bit & basis) is encoded in the relative phase $\gamma$ by the phase modulator inside the AMZI. On the right, 12 random phase values for $\rho$ and the 4 random values for basis (Z=0, X=$\pi/2$) and bit ("0"=0, "1"=$\pi$) are shown.

In the scheme of FIG. 12(c), Alice prepares two optical pulses as before, with exactly the same phases as before. However this time she uses 4 phase modulators to prepare the phases $\rho$ and $\gamma$. The two phase modulators in the AMZI's top arm prepare the red pulse with $\gamma_A+\rho$, whereas the two in the bottom arm prepare the blue pulse with $\gamma_B+\rho$. So, the global phase $\rho$ is the same as before and the same for both pulses, whereas the relative phase $\gamma$ is given by the difference of the two absolute phases, leaving $\gamma=(\rho+\gamma_B)-(\rho+\gamma_A)=\gamma_B-\gamma_A$. If the users select $\gamma_A$ and $\gamma_B$ among the 4 values shown in the diagram on the right (0, $\pi/2$, $\pi$, $3\pi/2$), the resulting $\gamma$ will also be one of these four values (easy to verify by subtracting all the possible combinations of values for $\gamma_A$ and $\gamma_B$ and remembering that $\pi=-\pi$, $3\pi/2=-\pi/2$).

Applying the above to FIG. 12(d). In PMDI, it can be imagined that the upper part of the AMZI is assigned to Alice, while the lower part is assigned to Bob (see figure). All goes exactly as in scheme 12(c), with the only difference that each party doesn't know the phases prepared by the other party. In any case, when the red and blue pulses reach the central beam splitter, they will have a relative phase equal to $\gamma=\gamma_B-\gamma_A$, as before. This happens if $\rho$ is the same in Alice and Bob, as in scheme 12(c). However, it is not guaranteed that $\rho$ is the same for Alice and Bob, because they are preparing it independently of each other. This is why the public discussion is required for the global phase: every time $\rho$ is the same, the users keep that run otherwise they discard it.

Figure 13A:
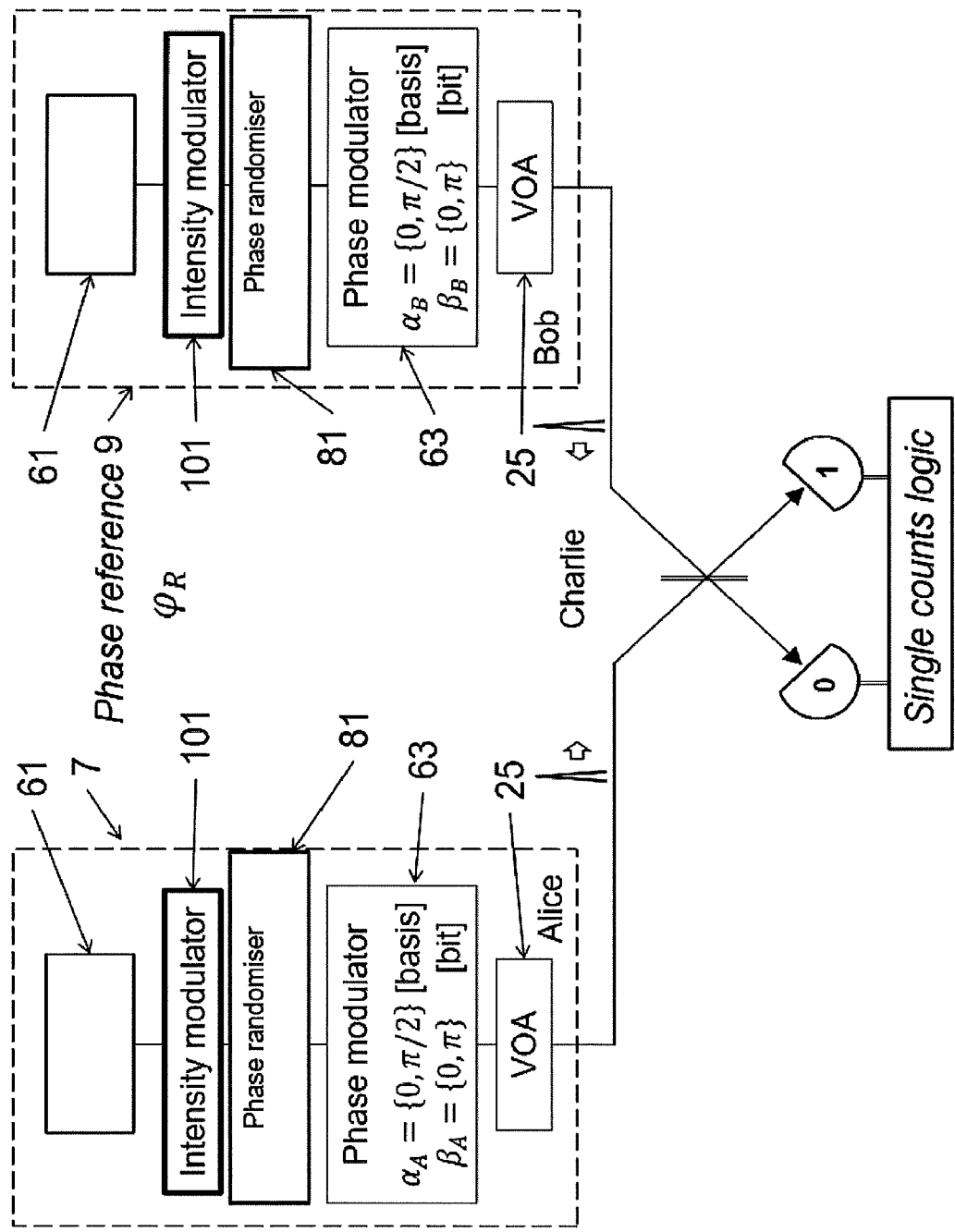
FIG. 13(a) is a schematic of MDI QKD system in accordance with an embodiment adapted to implement a decoy state protocol.

In a further embodiment, the above method is adapted to include decoy states. An example is shown in FIG. 13(a), where a scheme for "decoy-state discrete-phase-randomised phase-based MDI-QKD" (dsPMDI) is shown. To avoid an unnecessary repetition, like reference numerals will be used to demote like features. Intensity modulators 101 are placed in Alice 7 and Bob's 9 modules between the light sources 61 and the phase modulators 63 deputed to encode the basis and bit values.

The intensity modulators 101 are fast devices and work at the same clock rate as the generation of the optical pulses. They modulate the intensity of each optical pulse emitted by the light sources 61 in decoy-state QKD and decoy-state MDI QKD. The value of the intensity imparted by the intensity modulators is chosen at random with the help of a random number generator (not shown in FIG. 13(a)). Moreover, to accommodate decoy states, the public discussion has been modified to include, after Charlie's announcement, the announcement of the intensity values in addition to the other information about random phase slices and bases. After Charlie announces his counts, the users will disclose bases and phases as described above. Then the intensity values of the counts will be disclosed as well. (However, it should be noted that the intensities may even be disclosed prior to the phases and basis.) From the disclosed information, the users can reconstruct the secure key rate of the protocol and distil the quantum keys.

Figure 13B:
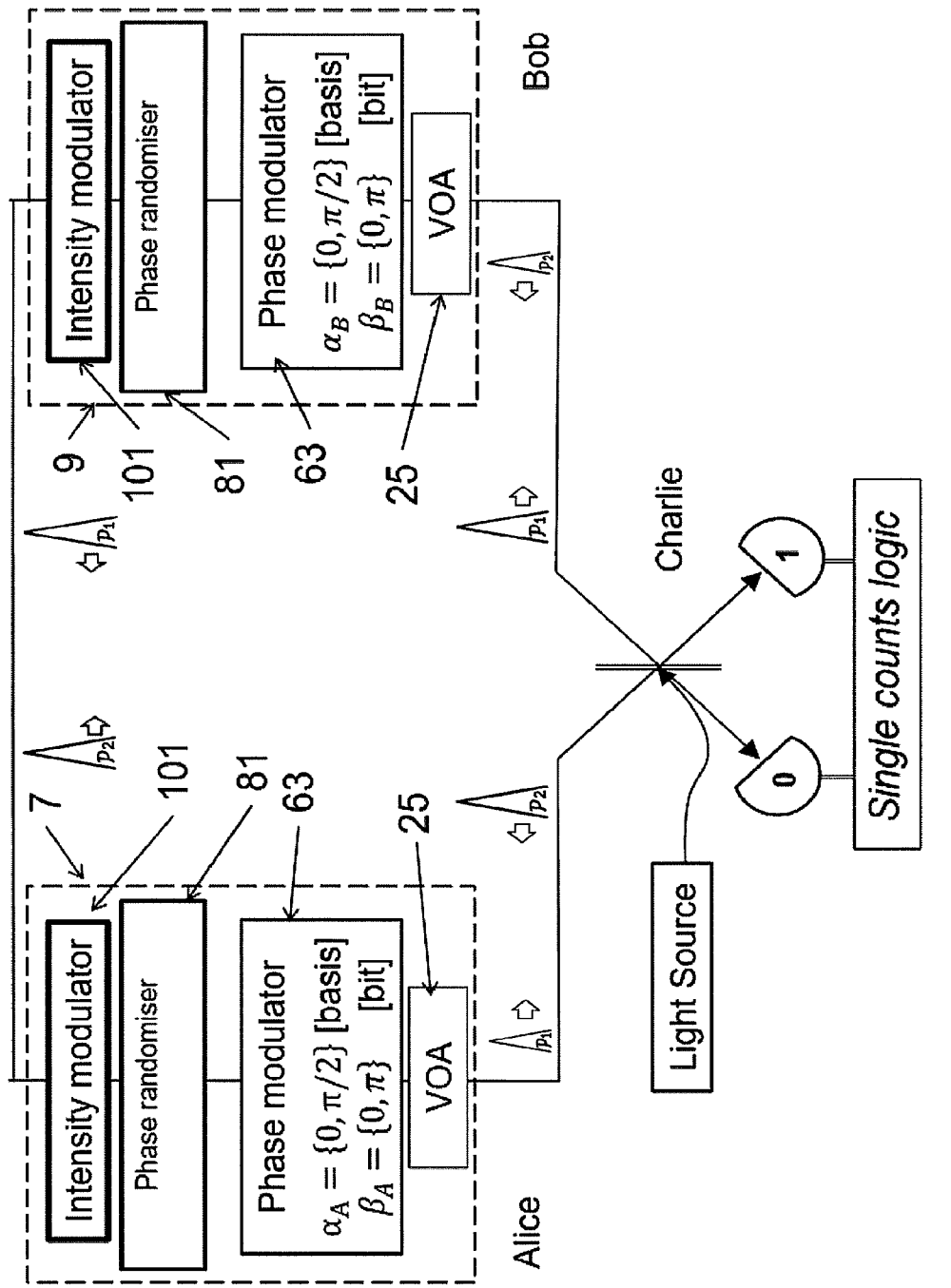
FIG. 13(b) is a schematic of MDI QKD system in accordance with an embodiment adapted to implement a decoy state protocol with a closed loop arrangement.

An alternative scheme to implement decoy-state PMDI is depicted in FIG. 13(b), where each peripheral device in the phase-based MDI-QKD scheme of FIG. 7 has been endowed with intensity modulators 101 to allow the implementation of the decoy state technique. The intensity of the optical pulses received from a given peripheral device is modulated by the intensity modulator 101 in the other peripheral device, using decoy-state QKD and decoy-state MDI QKD.

In the implementation of decoy states, each user prepares one of three intensities, called u, v and w. More intensities are also possible. Typical values are u=0.5, v=0.1 and w<0.001. $\{u_A, v_A, w_A\}$ will be used to refer to the three intensities prepared by Alice and $\{u_B, v_B, w_B\}$ the three intensities prepared by Bob. Alice and Bob know their own preparation but not the preparation of the other user. They will reconcile their intensities during the public discussion, as previously explained in relation to FIGS. 13(a) and (b). For each pair of optical pulses prepared by Alice and Bob and detected by Charlie, Alice and Bob can calculate the gain $Q_{\mu,\alpha}$ of each combination of the intensities and for each basis, where $\mu$ is the generic intensity given by the sum of the intensities of Alice's pulse and Bob's pulse, and with $\alpha=\alpha_A=\alpha_B$ the matched basis, Z or X, announced by Alice and Bob. The gain is defined as:

$$Q_{\mu,\alpha} = p_\mu p_\alpha Y_{\mu,\alpha}, \quad (27)$$

where $p_\mu$ is the probability that the users prepares intensities adding up to $\mu$; $p_\alpha$ is the probability that both Alice and Bob choose the same basis $\alpha$; $Y_{\mu,\alpha}$ is the yield, i.e., the conditional probability that Charlie has a click in his detectors conditional on the users' preparation of $\mu$ and $\alpha$. The yield $Y_{\mu,\alpha}$ is a measurable quantity in the typical QKD experiment as it amounts to the number of counts registered by Charlie divided by the number of preparations by the users for the combination $\mu$, $\alpha$.

In an embodiment, there will be 9 combinations for the gain in each basis:

$$Q_{u_A+u_B,\alpha}$$

$$Q_{v_A+v_B,\alpha}$$

$$Q_{w_A+w_B,\alpha} \quad (28)$$

$$Q_{u_A+v_B,\alpha} = Q_{v_A+u_B,\alpha}$$

$$Q_{u_A+w_B,\alpha} = Q_{w_A+u_B,\alpha}$$

$$Q_{v_A+w_B,\alpha} = Q_{w_A+v_B,\alpha} \quad (29)$$

From Eqs. (27)-(29), Alice and Bob can infer the single-photon yield $y_{1|\alpha}$ in the $\alpha$ basis. From it, the single-photon gain $q_{1|\mu\alpha}$ for the total intensity p in the $\alpha$ basis is given by the following expression:

$$q_{1|\mu\alpha} = p_{1|\mu} p_\alpha y_{1|\alpha}, \quad (30)$$

where $p_{1|\mu}$ is defined in Eq. (18).

The next step in the decoy-state technique is to estimate the single-photon QBER $e_{1|\alpha}$, which has analogous meaning to the one in Eq. (22). For that, Eq. (28) can be used, where the intensities of the optical pulses emitted by Alice and Bob are the same. When $y_{1|Z}$ and $e_{1|X}$ are available, the key rate for dsPMDI is given by:

$$R_{dsPMDI} = \frac{1}{L} \times p_Z^2 p_u \{-f_{EC} Y_{uZ} h(E_{uZ}) + p_{1|y} y_{1|Z}[1 - h(e_{1|X})]\}. \quad (31)$$

In Eq. (31), it is assumed that the key bits are distilled from the optical pulses whose intensities add up to u, so $p_u = p_{u_A} p_{u_B}$. The above key rate is similar to the GLLP one, Eq. (17), but with two differences. The first is that the parameters $y_{1|Z}$ and $e_{1|X}$ are estimated through the decoy-state technique rather than through the GLLP worst-case. The second is the presence of the factor 1/L, which is a characteristic of PMDI (both with and without decoy states), due to the presence of L phase values, randomly selected by the users. It should be noted that in order to apply the decoy-state protocol, the phase of the optical pulses must be random.

So far it has been assumed that PMDI and dsPMDI are performed either on a scheme where phase noise is passively compensated, e.g. the one in FIG. 7, or on a scheme that is ideal, e.g. the one in FIG. 1, where all the phases involved are assumed to be perfectly stable and there is no phase noise at all. This is because the PMDI schemes can be described independently of the phase noise. Further, there is a plethora of solutions in the prior art to stabilise the phase noise in optical communications, mostly using bright light pulses. Thus, it can be assumed that one of these solutions is applied to PMDI to guarantee a perfect phase stability. However, despite the above comments, phase noise can play an important role in practice, thus, the following embodiments will describe techniques for mitigating phase noise.

Figure 14:
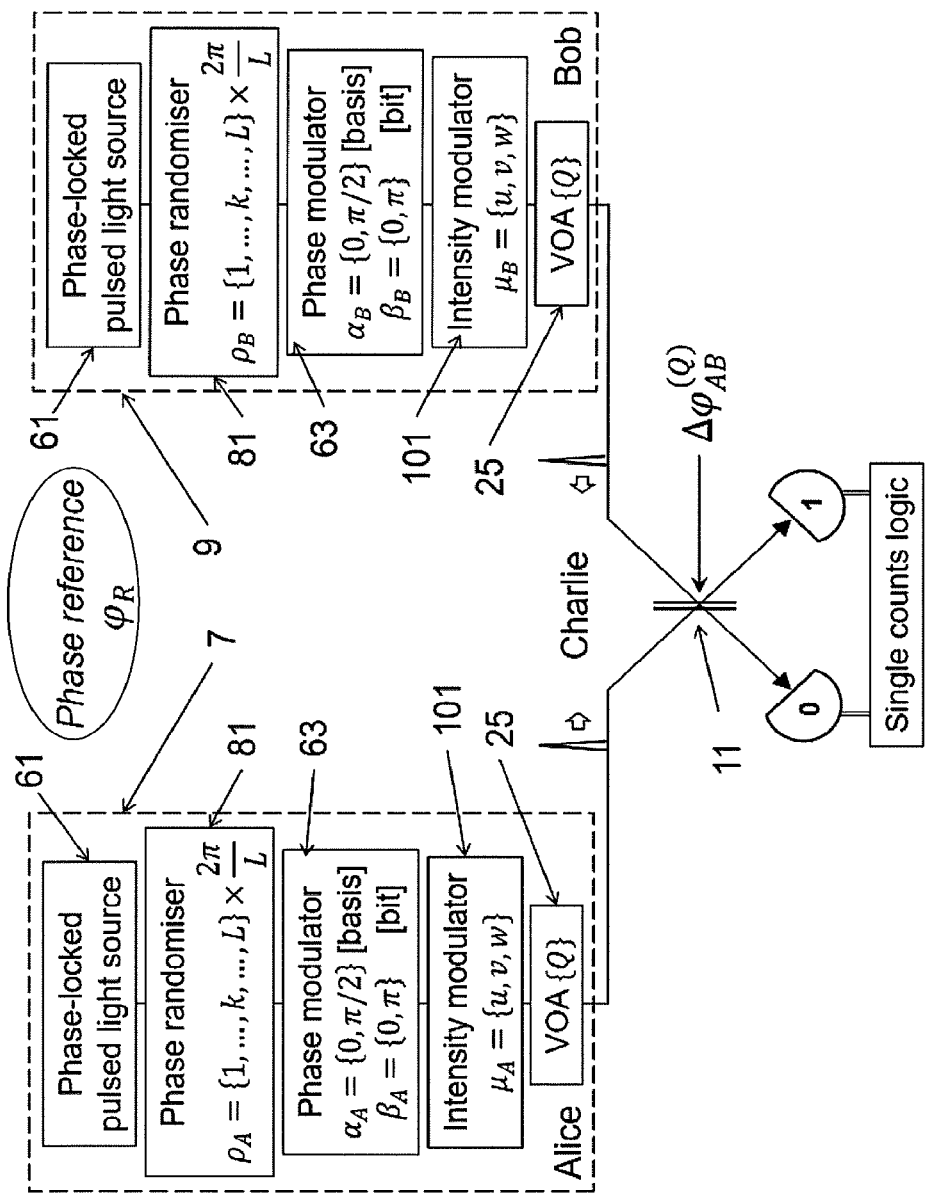
FIG. 14 is a schematic of MDI QKD system in accordance with an embodiment working in a quantum modality.
Figure 15:
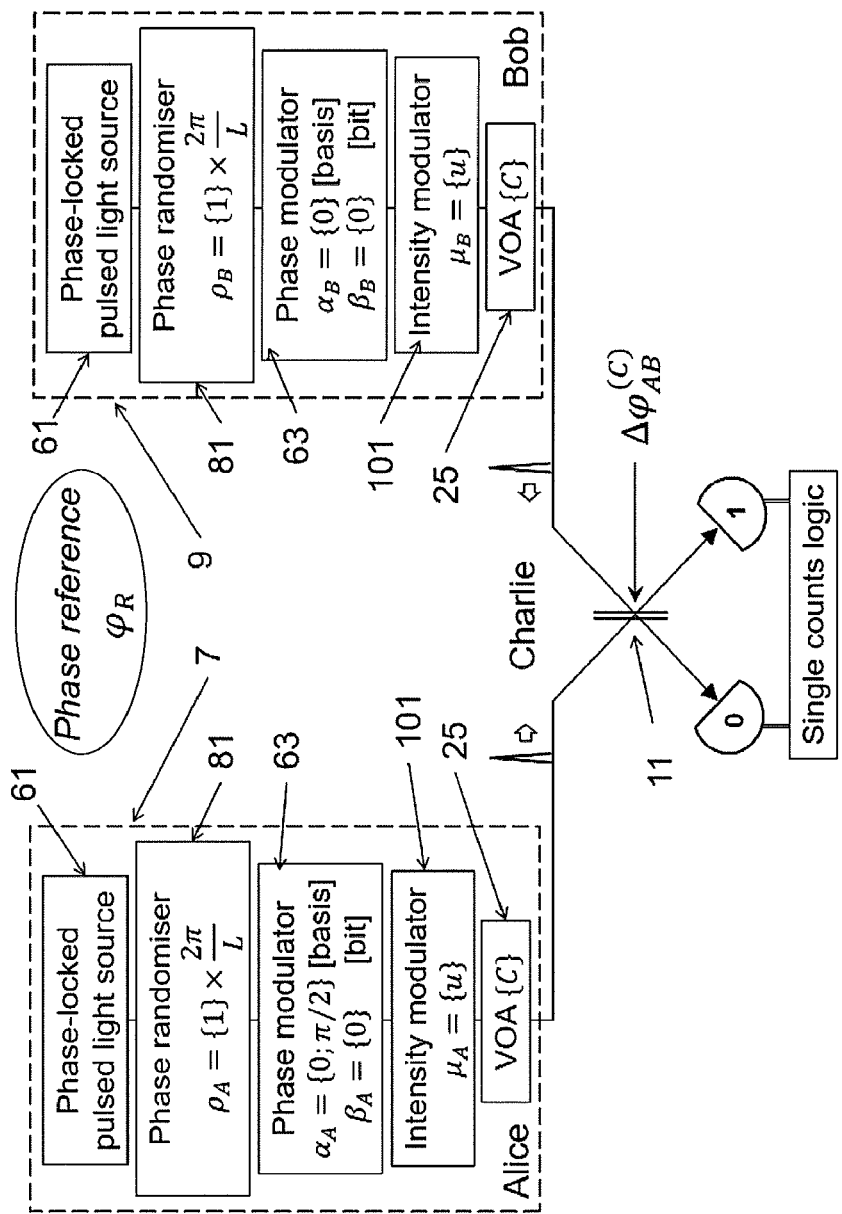
FIG. 15 is a schematic of MIDI QKD system in accordance with an embodiment working in a classical modality.

In the next two embodiments, the main dsPMDI embodiment, shown in FIG. 13(a) is adapted to work in two modalities: "quantum" (FIG. 14) or "classical" (FIG. 15). The former modality is used to distribute secure quantum keys to Alice and Bob via dsPMDI. The second modality, on the other hand, is used to align the phase references of the distant users and to compensate the phase noise of the system.

The quantum modality will be explained with reference to FIG. 14. To avoid any unnecessary repetition, like reference numerals will be used to denote like features. The aim of this modality is to let Alice 7 and Bob 9 distil a secure quantum key, assuming that there is no phase noise in the system. The phase noise will be compensated, in fact, in the classical modality. So all the devices work as already described: the VOA 25 is set to emit optical pulses attenuated at the single photon level (indicated by the letter "Q" in FIG. 14). All the other modulators encode at random the values of phase slice, basis, bit and intensity. The result of Charlie's 11 measurement depends on the interference of the optical pulses emitted by Alice 7 and Bob 9 at the central beam splitter. In particular, depending on the value of the relative phase between Alice and Bob's quantum optical pulses, $\Delta\varphi_{AB}^{(Q)}$, one of the two detectors owned by Charlie will click, either '0' or '1'. Due to having no phase noise in the system, the users know the value of $\Delta\varphi_{AB}^{(Q)}$. Therefore Alice 7 and Bob 9 can reconstruct the bit value of the other user during the public discussion after Charlie announces which detector clicked.

The classical modality will now be explained with reference to FIG. 15. The aim is now to align the phase reference of the distant users and mitigate the phase noise in the system. For that, Alice 7 and Bob 9, at certain times agreed beforehand, act on their components and perform, essentially, two operations.

First, Alice and Bob set their VOA 25 to emit optical pulses that are not attenuated at the single photon level. These optical pulses will be referred to as "classical" and indicate the corresponding VOA setting for this modality with the letter "C" (see FIG. 15). The exact intensity of the "classical" optical pulses depends on the experimental conditions. An indicative value can be from 20 dB to 80 dB more intense than the "quantum" optical pulses. To generate the classical pulses it is also possible to act on the intensity modulator 101 in the Alice and Bob's modules 7 and 9 rather than on the VOA 25. Which component is the most suitable to generate classical optical pulses depends on experimental parameters like the desired intensity and the repetition rate: VOA 25 can be used to generate high-intensity optical pulses, whereas the intensity modulator 101 is more suitable for creating classical pulses at high repetition rates.

As a second operation to enable the classical modality, Alice and Bob set all their modulators to a fixed value, disabling the random generation during this modality. To give an example, it can be imagined that the phase randomisers are set to the value $2\pi/L$, basis and bit are both set to 0 and the intensity modulator is set to emit u. Other set points are possible of course.

When the two above operations are completed, the outcome of Charlie's measurement is related to the value of the relative phase between Alice and Bob's classical pulses $\Delta\varphi_{AB}^{(C)}$. Alice and Bob can read this value and exploit it to align their systems and mitigate the phase noise. We notice that when Alice and Bob go into the classical modality, they will stop the distillation of a quantum key and focus only on the correction of the phase noise. Hence the security remains unaffected. We also notice that if the classical modality is enabled often enough, then the system remains aligned during the quantum modality and we have $\Delta\varphi_{AB}^{(Q)} = \Delta\varphi_{AB}^{(C)}$. This allows the users to know $\Delta\varphi_{AB}^{(Q)}$ and distil a key in the quantum modality, as explained in detail later on.

Figure 16:
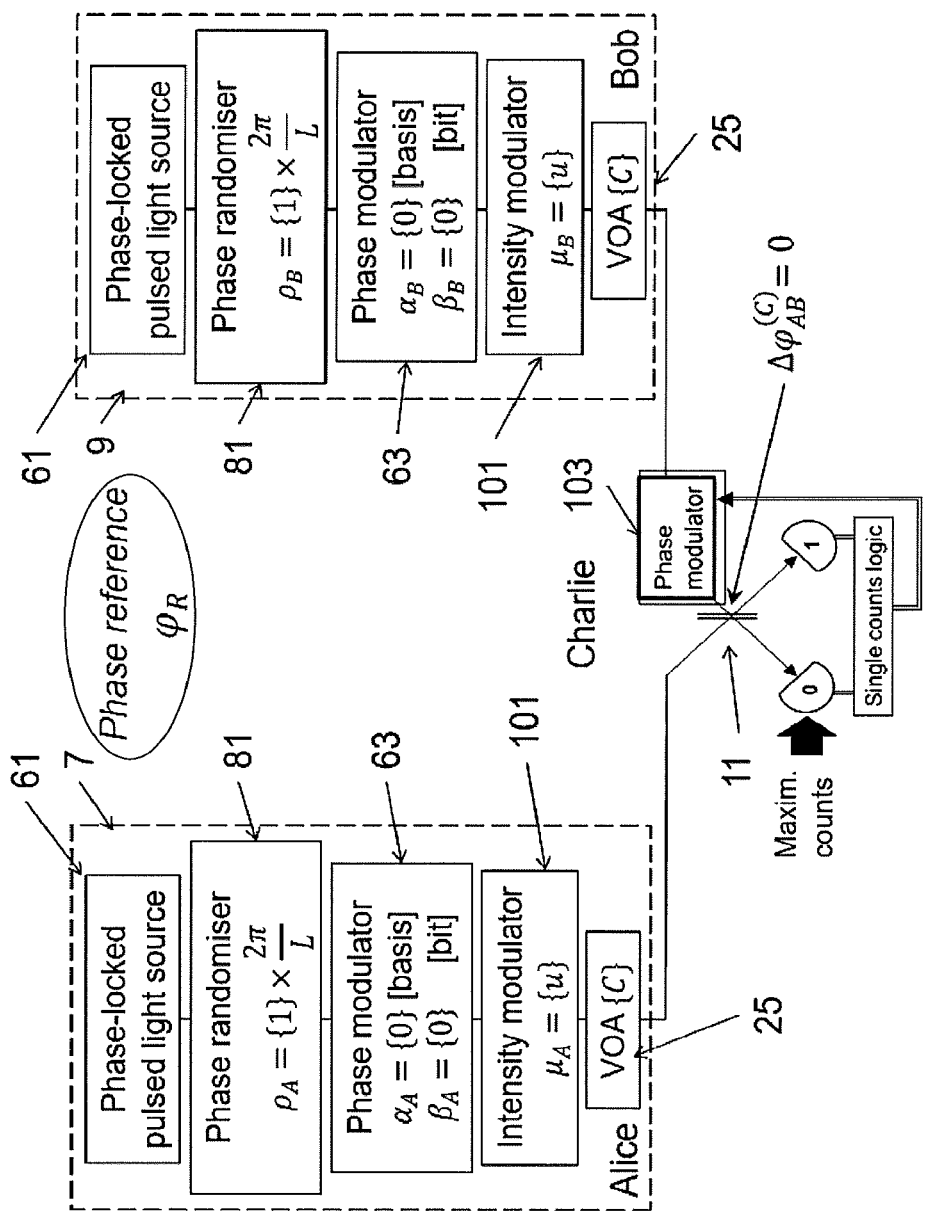
FIG. 16 is a schematic of MDI QKD system in accordance with an embodiment working in a classical modality having a phase modulator in the detection unit.

The classical modality of dsPMDI can be used to actively compensate for the phase noise, as depicted in FIG. 16. The aim here is to have in the classical modality a constant phase difference at the central beam splitter between the phases of Alice and Bob's optical pulses, which will be called $\varphi^a$ and $\varphi^b$, respectively:

$$\Delta\varphi_{AB}^{(C)} = \varphi^b - \varphi^a = \text{constant}. \quad (32)$$

The simplest option is to set constant=0. Then the interference on the beam splitter is such that only Charlie's detector '0' clicks. Therefore, in one embodiment, to actively enforce this condition in the system, Charlie places a phase modulator 103 on Bob's path so to change the value of $\varphi^b$ until the counts in the '0' detector are maximised. Upon meeting this condition, Alice and Bob know that their phase references are aligned.

Figure 17:
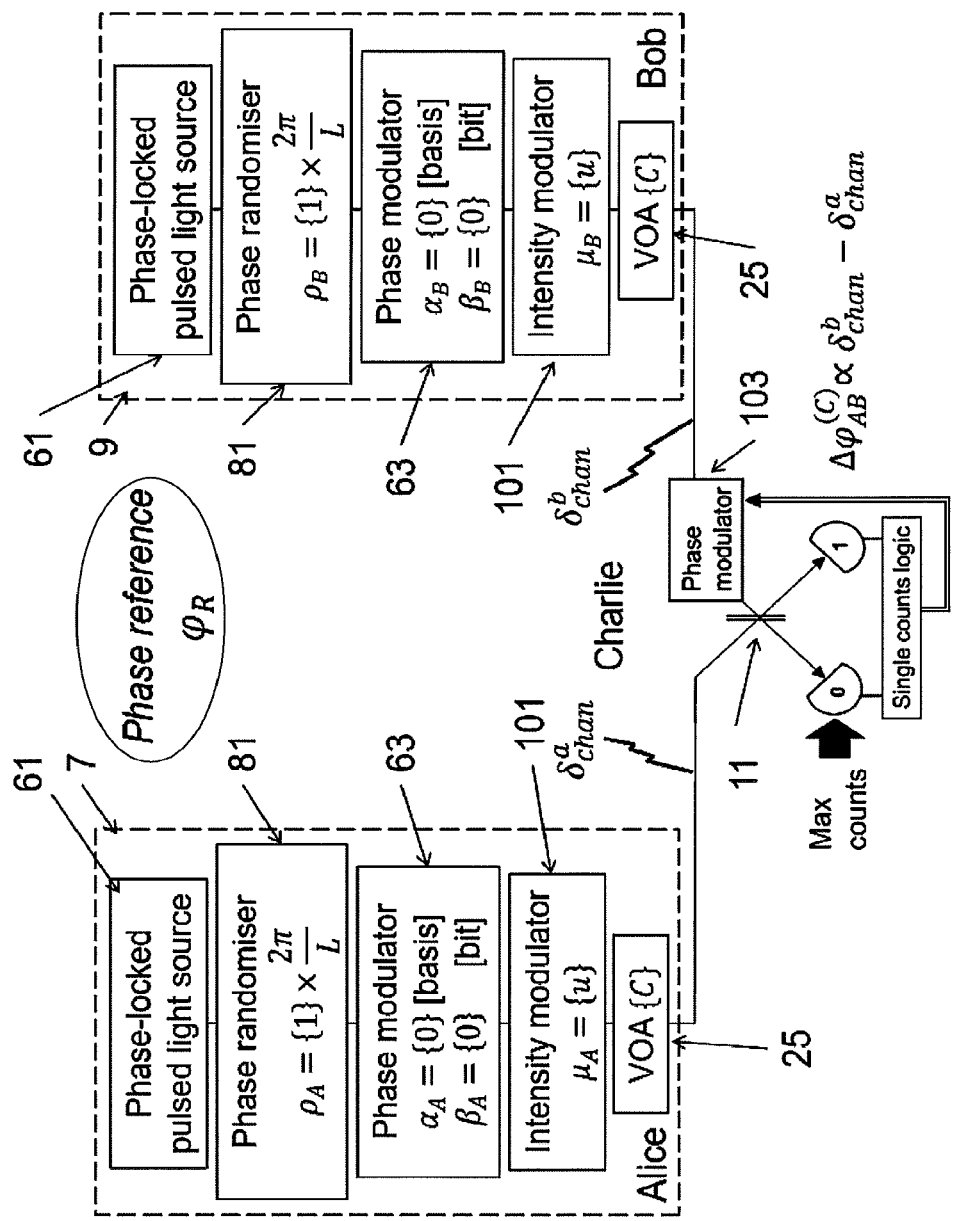
FIG. 17 is a schematic of MDI QKD system in accordance with an embodiment working in a classical modality having a phase modulator in the detection unit compensating for the noise on the communication channels.

FIG. 17 is a system in accordance with an embodiment, where the system is affected by the phase noise due to the propagation of the optical signals in the communication channels. Due to the random density or geometrical variations in the propagation medium, the phase of the optical pulses emitted by Alice and Bob will change in unpredictable way. Thus, even if initially the optical pulses were perfectly phase aligned, during their trip to Charlie they will lose the locking with the phase reference. In FIG. 17, $\delta_{chan}^a$ and $\delta_{chan}^b$ will be used to denote the phase errors added to Alice 7 and Bob's 9 optical pulses, respectively, during the propagation in the optical channels.

To actively solve this problem, the classical modality of dsPMDI can be combined with exactly the same solution described in the previous section, i.e., a phase modulator 103 under Charlie's 11 control placed on Bob's 9 path tuned to maximise the counts in the detector '0' (or minimise the counts in the detector '1'). This time the set point condition will include the channel phase noise:

$$\Delta\varphi_{AB}^{(C)} = \varphi^b - \varphi^a + \delta_{chan}^b - \delta_{chan}^a = 0. \quad (33)$$

Charlie will tune the phase modulator 103 on Bob's path to change $\varphi^b$. When $\varphi^b = \varphi^a - \delta_{chan}^b + \delta_{chan}^a$, the detector '0' counts will be maximised (or detector '1' counts will be minimised) and condition in Eq. (33) will be met. At this point, Alice and Bob know that their phase references are aligned despite the presence of the phase noise on the communication channels.

In the next embodiment, an alternative solution is provided that does not require the phase modulator 103 in Charlie's module 11 and performs the same operations described in the previous sections passively, as a form of data post-processing.

The reconciliation mechanism in post-processing is depicted in FIG. 18. The key idea is to switch, at predetermined times, from the quantum modality of FIG. 14 to the classical modality of FIG. 15; record the outcomes of Charlie's measurement; go back to the quantum modality; and repeat as often as requested by the experimental conditions. One subtle, technical, detail in FIG. 16 related to the first-order interference mechanism is that in order to reliably read the relative phase $\Delta\varphi_{AB}^{(C)}$, Alice has to encode sometimes the basis value $\pi/2$, also depicted in FIG. 15, in addition to 0. In fact, the outcome of Charlie's measurement remains exactly the same if a phase $\pi$ is added to $\Delta\varphi_{AB}^{(C)}$. By adding $\pi/2$, Alice 7 removes this ambiguity and the value of $\Delta\varphi_{AB}^{(C)}$ becomes fully accessible to the users.

As explained, during the classical modality, the users have access to the quantity $\Delta\varphi_{AB}^{(C)}$. However, this time, they do not have to make $\Delta\varphi_{AB}^{(C)}$ equal to a predetermined constant value, as in Eqs. (32) and (33). They only need to record its value when it is measured. We notice that to measure this value, the dsPMDI system has possibly to remain in the classical modality for several runs, until a reliable mean value of $\Delta\varphi_{AB}^{(C)}$ is obtained. The underlying assumption here is that the value of the relative phase does not change too quickly and remains approximately constant over a certain number of runs, which we call K. This is indicated by the following expression:

$$\Delta\varphi_{AB}^{(C,k)} \cong \Delta\varphi_{AB}^{(C,k+1)} \cong \ldots \cong \Delta\varphi_{AB}^{(C,k+K)} \cong \Delta\varphi_{AB}^{(C)}, \quad (34)$$

where $\Delta\varphi_{AB}^{(C,k)}$ is defined as the instantaneous value of $\Delta\varphi_{AB}^{(C)}$.

After a reliable value of the relative phase has been acquired in the classical modality, Alice and Bob run the dsPMDI scheme in the quantum modality for a number of runs less than K. The outcome of Charlie's measurement depends on the relative phase of Alice and Bob's optical pulses which, in the quantum modality, we call $\Delta\varphi_{AB}^{(Q)}$. This relative phase includes the measured classical relative phase, $\Delta\varphi_{AB}^{(C)}$, assumed to remain constant during the K runs, as well as the random slices encoded by Alice and Bob, $\rho_A^{(k)}$ and $\rho_B^{(k)}$, the random bases, $\alpha_A^{(k)}$ and $\alpha_B^{(k)}$, and the random bits, $\beta_A^{(k)}$ and $\beta_B^{(k)}$:

$$\Delta\varphi_{AB}^{(Q)} = \Delta\varphi_{AB}^{(C)} + (\rho_B^{(k)} - \rho_A^{(k)}) + (\alpha_B^{(k)} - \alpha_A^{(k)}) + (\beta_B^{(k)} - \beta_A^{(k)}). \quad (35)$$

In Eq. (35), the quantity $\Delta\varphi_{AB}^{(C)}$ has been measured in the classical modality and the quantities $\rho^{(k)}$ (phase slices) and $\alpha^{(k)}$ (bases) are revealed during the public discussion. Therefore Alice and Bob can infer the bit values $\beta^{(k)}$ from Eq. (35) and Charlie's measurement. This will now be explained in more detail.

First of all, Alice and Bob will run a refined version of public discussion, summarised in the table of FIG. 18. In this refined public discussion, after Charlie's communication, the users calculate the quantity $\Delta\varphi_{AB}^{(C)}$ acquired in the classical modality and then reveal their phase slices for the run k, $\rho_A^{(k)}$ and $\rho_B^{(k)}$ (for simplicity, the index k is not reported in FIG. 18). Then Alice and Bob select only the runs where the following condition is satisfied and discard all the others:

$$\Delta\varphi_{AB}^{(C)} = \rho_A^{(k)} - \rho_B^{(k)}. \quad (36)$$

It is worth noticing that this condition is met with probability 1/L, with L the number of phase slices. This is equal to the simpler public discussion of FIG. 6, where the phase noise was absent. This entails the important fact that the factor 1/L in the dsPMDI key rate, Eq. (31), is not modified even with the correction of phase noise performed in post-processing.

When the condition in Eq. (36) is met, the users' systems are aligned. Then Alice and Bob can proceed and reveal their bases, keeping only those cases where the bases match and discarding all the others. Therefore, for the non-discarded runs, the expression in Eq. (35) becomes:

$$\Delta\varphi_{AB}^{(Q)} = \beta_B^{(k)} - \beta_A^{(k)}. \quad (37)$$

Since the phase values of the bit variable $\beta$ can only be 0 and $\pi$, the value of $\Delta\varphi_{AB}^{(Q)}$ can only be 0 or $\pm\pi$, the former (the latter) leading to a click of Charlie's detector '0' ('1'). Therefore it can be clearly seen from Eq. (37) that Alice (Bob), who knows $\beta_A^{(k)}$ ($\beta_{B(k)}$), can infer the bit value $\beta_B^{(k)}$ ($\beta_A^{(k)}$) after knowing the result of Charlie's measurement.

Figure 19:
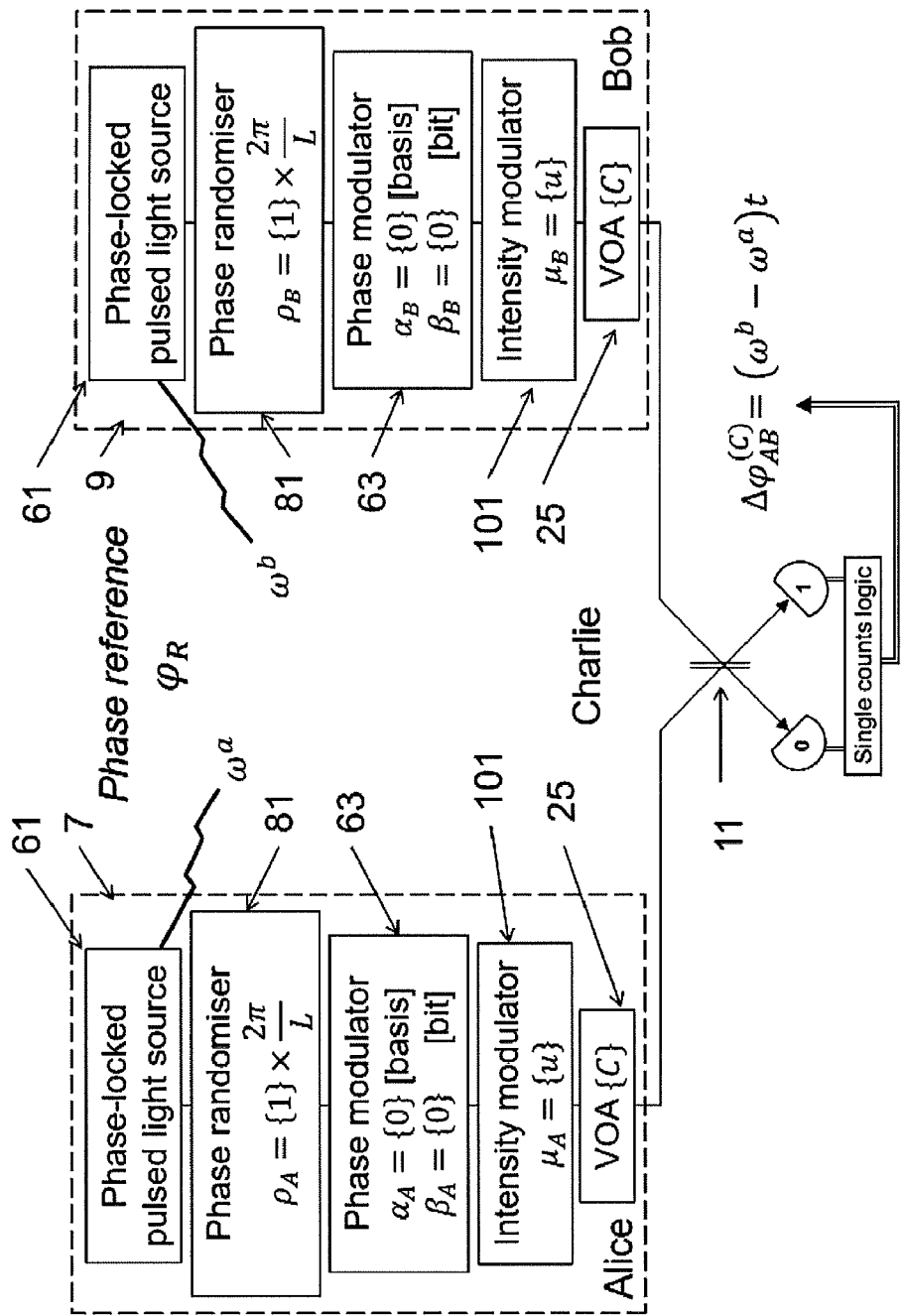
FIG. 19 is a schematic of MDI QKD system in accordance with an embodiment to demonstrate the issues addressed by an optical phase locked loop.

In a yet further embodiment, phase noise which arises from the light sources will be considered (see FIG. 19). Alice and Bob's light sources are far apart and never perfectly identical. For instance, if they are implemented with lasers with slightly different central frequencies, $\omega^a$ (Alice) and $\omega^b$ (Bob), the relative phase difference between the users will drift in time as $(\omega^b - \omega^a)t$, causing the misalignment of the systems and a drift in Charlie's measurement's results.

Figure 20:
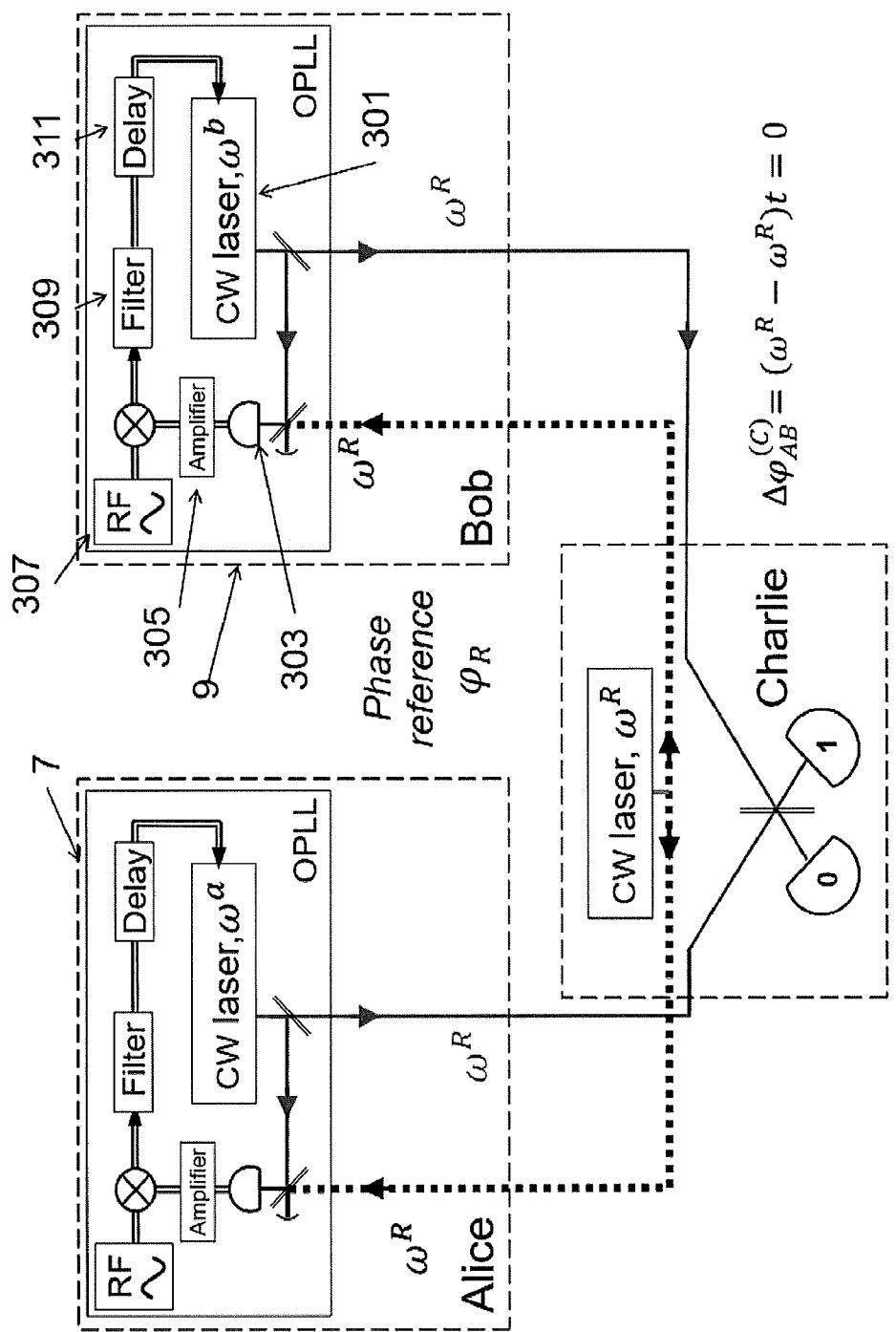
FIG. 20 shows how to use a phase locked loop to solve the problem depicted in FIG. 19.

To mitigate this problem, an optical phase locking loop (OPLL) can be employed. It will be assumed for definiteness that all parties are endowed with a continuous wave (CW) laser. It is not difficult to extend this to pulsed lasers. Charlie's laser emits light towards Alice and Bob's stations using a first optical channel (dotted paths). Alice and Bob will both have an OPLL to phase lock their lasers to Charlie's. They will use the phase-locked lasers and transmit optical pulses back to Charlie (solid lines). Alice and Bob's setup are identical, in principle, so only describe Bob's setup will be described. FIG. 20 shows the OPLL in more detail.

When Charlie's light enters Bob's module 9, it will interfere with the light emitted by Bob's CW laser 301. The resulting interference depends on the relative phases of the two lasers and determines the amount of light distributed between the two output ports of the beamsplitter. At one of the output ports, a detector 303 measures the output light and emits an electric signal that is amplified 305 and then mixed with a radio-frequency (RF) signal emitted by a local oscillator 307. The resulting low-frequency electric signal passes through a filter 309 and a delay 311 and is then fed back into Bob's CW laser 301 to adjust its frequency. The same procedure can be applied to Alice's CW laser, the users' modules will be both locked to Charlie's laser and will therefore be reciprocally phase locked. Any residual constant phase difference between Alice 7 and Bob's 9 modules can be removed using the techniques presented in the previous sections.

The phase-locking mechanism just described works effectively provided that the free-running frequency difference between Alice 7 and Bob's 9 lasers is small enough, i.e., much smaller than the inverse of the time required by the OPLL to tune the lasers' frequencies. Also, the central frequency of Charlie's laser should not be affected too much during the propagation along the optical channels. Finally, when the phase noise due to the propagation of the optical pulses in the communication channels is taken into account, the condition for phase locking is that the OPLL is faster than the phase noise due to the propagation.

Figure 21:
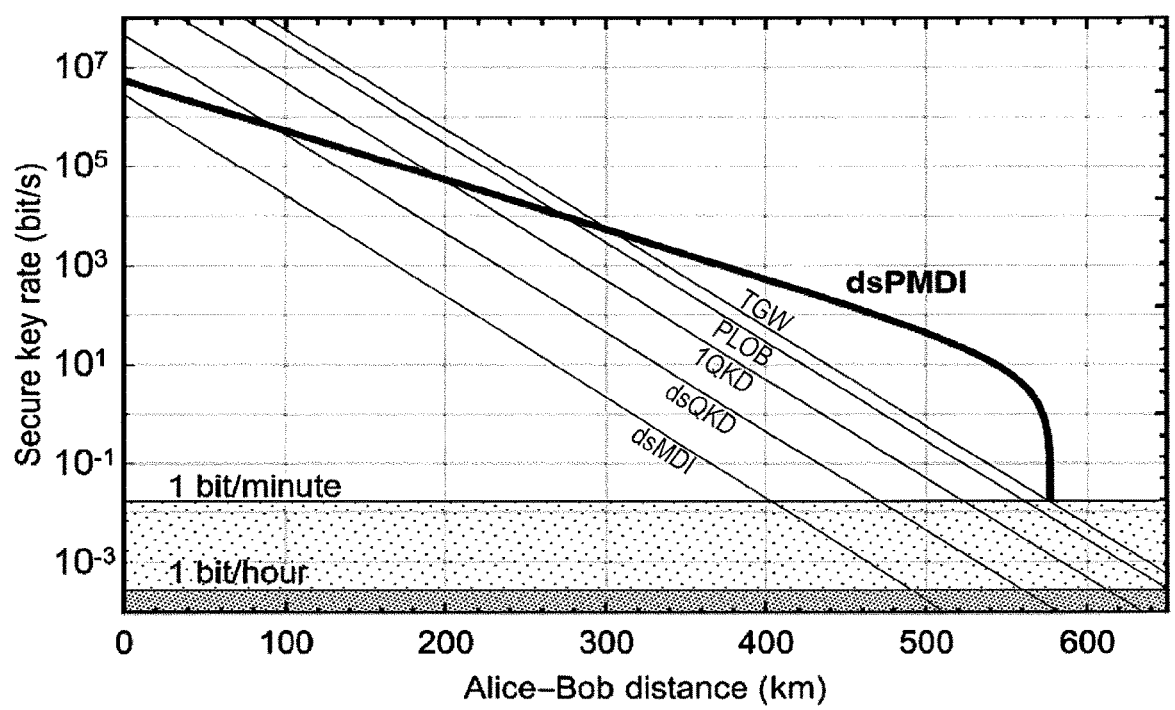
FIG. 21 shows the length over which systems in accordance with embodiments can securely transmit a quantum key.

FIG. 21 shows the results of a simulation of a system of the type described with reference to FIG. 13(a) relating to dsPMDI. The results are shown for L=12 discrete random phase slices (see FIG. 12). The phase noise can be corrected either in real time or in post-processing, as there is no conceptual difference in the final secure key rate. The simulation shows the secure key rate in bit/s versus the distance between Alice and Bob for dsPMDI (thick line) and for other protocols (thin lines), using either the same experimental parameters, or experimental parameters that are more favourable to the other protocols. This is done to convincingly show the advantage of dsPMDI.

It can be seen that dsPMDI allows to reach a distance of almost 600 km with single-photon superconducting detectors that are currently commercially available. This is well beyond the feasibility range of any current quantum scheme, with the same detectors or even with better detectors. The new protocol shows a scaling of the key rate with the distance that goes like the square root of the distance, as opposed to linear for any other scheme involving QKD or MDI-QKD. This is its main advantage.

As a comparison, we also show in FIG. 21 the key rates for MDI-QKD implemented with decoy states and dark-count-free single-photon detectors (dsMDI); QKD implemented with decoy states and dark-count-free single-photon detectors (dsQKD); QKD implemented with a true single-photon source and dark-count-free single-photon detectors (1QKD). The other two lines, PLOB and TGW are theoretical rate-loss bounds for a repeater-free quantum communication. They establish the best possible secret key rate that can be achieved on a noiseless and lossy channel in absence of a quantum repeater. These bounds have not yet been overcome by any quantum point-to-point transmission to date. It is apparent that dsPMDI can overcome all the mentioned bounds when the distance between Alice and Bob is larger than about 300 km.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A quantum communication system for distributing a key between first and second units, the system being configured to implement phase-based measurement device independent quantum cryptography, the system comprising first and second units adapted to apply phase shifts to light pulses and a detection unit adapted to cause interference between light pulses received from the first and second units and measure said interference, wherein the first and second units each comprise at least one phase modulator adapted to apply a phase shift, said phase shift comprising a global phase component and a relative phase component, wherein said global phase component represents a phase shift selected in the range from 0° to 360° from a fixed phase reference and said relative phase component is a phase shift selected from 0°, 90°, 180° and 270° from the phase shift introduced by the global phase component.

2. A quantum communication system according to claim 1, wherein the detection unit is adapted to cause first order interference between the pulses from the first and second units.

3. A quantum communication system according to claim 1, further comprising a random phase unit adapted to randomly select the global phase component over the range from 0° to 360°.

4. A quantum communication system according to claim 3, wherein the range from 0° to 360° is divided into L segments, where L is an integer of at least 3, and said random phase unit is adapted to randomly select a segment to apply the global phase.

5. A quantum communication system according to claim 4, wherein the random phase unit is configured to perform active selection of the global phase.

6. A quantum communication system according to claim 3, wherein the random phase unit is configured to perform passive selection of the global phase.

7. A quantum communication system according to claim 1, wherein the first and second units comprise a light source.

8. A quantum communication system according to claim 7, further comprising a light source in said detection unit, the system also comprising a phase locked loop to lock the phase of the light outputted from the detection unit with that of the two light sources in the first and second units.

9. A quantum communication system according to claim 1, wherein the detection unit comprises a light source, the system further comprising a first pathway adapted to direct light in a loop from the detection unit, through the first unit, through the second unit and then back to the detection unit, and a second pathway adapted to direct light in a loop from the detection unit, through the second unit, through the first unit and then back to the detection unit, the first and second units modulating the phase of the light pulses emitted from the detection unit.

10. A quantum communication system according to claim 1, further comprising an intensity modulator adapted to vary the intensity of pulses leaving the first and second units on a pulse-by-pulse basis.

11. A quantum communication system according to claim 1, wherein the detection unit comprises a phase modulator.

12. A quantum communication system according to claim 1, wherein the first and second units comprise a memory, said memory being adapted to store the global phase and the relative phase for each light pulse.

13. A quantum communication system according to claim 12, wherein a communication channel is provided between said first and second units, said first and second unit being provided with a processor, the processor in one unit being able to communicate with the processor in the other unit over the said communication channel, the processors in the first and second units being adapted to ignore measurement results where the global phase did not match.

14. A method of communicating an encryption key between first and second units in a quantum communication system, the method comprising:
applying phase shifts to light pulses that pass through a phase modulator in the first unit and applying phase shifts to light pulses that pass through a phase modulator in the second unit, said phase shifts comprising a global phase component and a relative phase component, wherein said global phase component represents a phase shift randomly selected in the range from 0° to 3600 from a fixed phase reference and said relative phase component is a phase shift randomly selected from 0°, 90°, 180° and 270° from the phase shift introduced by the global phase component, the relative phase shifts 0° and 180° forming a first measurement basis and the relative phase shifts 90° and 270° forming a second measurement basis; and
interfering light pulses received from the first and second units at a measuring unit, wherein the method further comprises announcing by the measuring unit the results of the interference measurements;
announcing by the first and second units the global phase applied to each measurement;
announcing by the first and second measure the basis used in the relative phase shift; and
deriving the key from the measurements where the global phase applied by the first and second units match and the basis used in the relative phase shift match, the first and the second unit both being able to derive the key from the knowledge of the relative phase shift applied and the result of the interference measurement.

15. A method according to claim 14, wherein the global phase is deemed to match if the global phase applied by the first and second units is within a misalignment angle.

16. A method according to claim 15, wherein the range from 0° to 360° is divided into L segments, where L is an integer of at least 3, and said random phase unit is adapted to randomly select a segment to apply the global phase.

17. A method according to claim 16, wherein privacy amplification is performed to derive said key.

18. A method according to claim 14, wherein the global phase is applied such that a measurement of the light pulses without knowledge of the global phase results in an incoherent superposition of the quantum states |n⟩ describing the number of photons in each pulse.

19. A method according to claim 18, wherein the incoherent superposition of the photon-number states |n⟩ is described by:

$$\sum_{n=0}^{\infty} e^{-\mu} \frac{\mu}{n!} |n\rangle\langle n|,$$

where $\mu$ is the mean photon number, or intensity, of the emitted pulses.

20. A method according to claim 14, further comprising:
applying intensity modulation to the pulses in the first and second units such that the intensity of the pulses leaving the first and second units varies between two of more fixed levels from pulse to pulse,
announcing the intensity applied to the pulses to allow the first and second units to perform statistics concerning the pulses.

* * * * *